United States Patent
Nukui et al.

(10) Patent No.: US 6,446,503 B1
(45) Date of Patent: Sep. 10, 2002

(54) FLOW VELOCITY MEASURING APPARATUS AND METHODS USING SENSORS FOR MEASURING LARGER AND SMALLER FLOW QUANTITIES

(75) Inventors: Kazumitsu Nukui, Fujisawa; Hideo Kato, Kurihashi-machi; Ken Tashiro, Kawagoe; Mitunori Komaki; Masahiko Matushita, both of Tokyo; Kazuhiro Yamada, Chiba, all of (JP)

(73) Assignee: Tokyo Gas Co., Ltd., Tokyo (JP)

( * ) Notice: Subject to any disclaimer, the term of this patent is extended or adjusted under 35 U.S.C. 154(b) by 0 days.

(21) Appl. No.: 09/577,882

(22) Filed: May 25, 2000

Related U.S. Application Data

(63) Continuation of application No. PCT/JP98/04688, filed on Oct. 16, 1998.

(30) Foreign Application Priority Data

Dec. 15, 1997 (JP) ............................................. 9-344595
Jul. 17, 1998 (JP) ........................................... 10-203516

(51) Int. Cl.[7] .............................................. G01F 7/00
(52) U.S. Cl. ....................................................... 73/197
(58) Field of Search ........................... 73/195, 196, 197, 73/202, 861.64

(56) References Cited

U.S. PATENT DOCUMENTS

| | | | | |
|---|---|---|---|---|
| 4,089,218 A | * | 5/1978 | Cushing | 73/189 |
| 4,688,432 A | * | 8/1987 | Marsh | 73/861.15 |
| 4,909,464 A | * | 3/1990 | Chiba et al. | 204/164 |
| 5,020,373 A | * | 6/1991 | Kamiunten et al. | 73/861.22 |
| 5,090,241 A | * | 2/1992 | Kobayashi | 73/204.26 |
| 5,230,245 A | * | 7/1993 | Kamiunten et al. | 73/195 |

FOREIGN PATENT DOCUMENTS

| | | | | |
|---|---|---|---|---|
| JP | A-4-262210 | 9/1992 | | |
| JP | A-6-129884 | 5/1994 | | |
| JP | 6265381 B1 | * 9/1994 | | 73/861.18 |
| JP | A-8-240469 | 9/1996 | | |

OTHER PUBLICATIONS

Measurement and Control Technology Series, "*Fluid Flow Measurement*", By Richard A. Furness, Chapter 13 Flowmeter costs and selection.
Measurement and Control Technology Series, "*Fluid Flow Measurement*" By Richard A. Furness, Differential pressure type flowmeters.
*Fluid Flow Measurement*, published by Longman Group UK Limited, By Richard A. Furness.

* cited by examiner

Primary Examiner—Benjamin R. Fuller
Assistant Examiner—Corey D. Mack
(74) Attorney, Agent, or Firm—Oliff & Berridge, PLC

(57) ABSTRACT

A flowmeter capable of measuring an accurate quantity of flow over a wide range of the quantity of flow. A measurement zone (15) for smaller quantity of flow and a measurement zone (16) for larger quantity of flow are determined inside a flow path (13) of a pipe (10). Regulating strainers (14) for regulating the flow of a gas (20) are disposed inside the measurement zone (15) for smaller quantity of flow by dividing the flow path (13) into a plurality of narrower flow paths (14A). A mean flow velocity of the gas (20) flowing through each of a plurality of narrower flow paths (14A) becomes substantially equal. A part of the gas (20) reaches nozzles (22a, 22b) erected across flow velocity sensors (15a, 15b) for smaller quantity of flow and is accelerated by the operation of these nozzles. The flow velocity sensors (15a, 15b) inside the measurement zone (15) for smaller quantity of flow output signals corresponding to the flow velocity of the gas (20) passed through the narrower flow path (14a) and accelerated by the nozzles (22a, 22b) in the range of the smaller quantity of flow. Flow velocity sensors (16a, 16b) for larger quantity of flow in the measurement zone (16) for lager quantity of flow output signals corresponding to the flow velocity of the gas (20) in the range of the larger quantity of flow.

50 Claims, 21 Drawing Sheets

II — II Cross section

|  | | Sensor output value | | |
|---|---|---|---|---|
|  | | Nozzle height | | |
|  | | 0 | 7 | 10 |
| Measurement condition | A | 0 | | |
| | B | | 7.09 | |
| | C | | | 13.72 |
| | D | | 7.64 | 14.21 |

FIG.10

Plan view
seen from the X arrow direction

XVII–XVII Cross section

XX–XX Cross section

XXII—XXII Cross section

XXVI–XXVI Cross section

FLOW VELOCITY MEASURING APPARATUS AND METHODS USING SENSORS FOR MEASURING LARGER AND SMALLER FLOW QUANTITIES

This is a Continuation of application Ser. No. PCT/JP98/04688 filed Oct. 16, 1998. The entire disclosure of the prior application(s) is hereby incorporated by reference herein in its entirety.

TECHNICAL FIELD

The present invention relates to a flowmeter for measuring the quantity of flow of a fluid such as gas and, more particularly, to a flowmeter capable of accurately measuring a quantity of flow over a wide range of the quantity of flow.

1. Background Art

Some flowmeters for measuring the quantity of flow of a fluid, such as gas, calculate the quantity of flow by disposing a flow velocity sensor in a flow path and multiplying the flow velocity obtained by the flow velocity sensor by the cross-sectional area of the flow path.

FIG. 29 shows a specific configuration of such a conventional flowmeter. In the flowmeter, a flow velocity sensor 1 is disposed in the center of a fluid flow path in a pipe 2. A flow quantity calculating unit 3 calculates the quantity of flow by multiplying the flow velocity in the center of the flow path obtained by the flow velocity sensor 1 by the cross-sectional area of the pipe 2 and the quantity of flow is displayed on a display unit 4. In order to maintain the high accuracy in flow quantity measurement by the flow velocity sensor, the flow velocity sensor 1 has to be disposed in the most stable flow of the fluid.

The conventional flowmeter has, however, a problem such that a mounting position of the flow velocity sensor 1 is difficult to be determined since a drift occurs in the pipe 2 depending on the quantity of flow. It is necessary to set the flow velocity sensor 1 in a limited range of flow quantity where the drift is small. The measurable range of the flow quantity is accordingly narrowed and it is difficult to accurately measure the flow quantity of gas over a wide flow quantity range. The drift denotes here that the flow velocity varies according to places. The flow quantity range denotes the range of the quantity of flow. The definition will be the same in the following description.

As described above, in the conventional flowmeter, it is difficult to set a sufficiently wide flow quantity measurement range by using a single flow velocity sensor. In order to solve the problem, the following method is considered. The flow quantity measurement range is divided into, for example, two ranges of a larger flow quantity range and a smaller flow quantity range. A flow velocity sensor for the range of the larger quantity of flow is assigned to the range of the larger quantity of flow and a flow velocity sensor for the range of the smaller quantity of flow is assigned to the range of the smaller quantity of flow. The quantity of flow is calculated by switching output signals from the flow velocity sensors.

In the flowmeter constructed by using the plurality of flow velocity sensors as described above, however, the flow of the fluid is disturbed by the existence of one of the flow velocity sensors and there is the possibility that the disturbance exerts an adverse influence on the measurement accuracy of the other flow velocity sensor. As a result, it is difficult to measure the quantity of flow with high accuracy over a wide measurement range of the quantity of flow.

Meanwhile, a gas meter for home use having not only the function of measuring the quantity of flow of passing gas but also a safety function realized by mounting a microcomputer is practically used. According to the safety function, for example, when the quantity of flow of gas equal to or higher than a predetermined quantity is detected or when a predetermined gas flow quantity is detected for predetermined time or longer, a gas emergency trip valve is driven to shut off the gas flow path. By the functions, a leakage in the pipe, unnatural gas outflow, and the like are detected, so that an accident can be prevented and the safety can be assured. For the accurate operation of the functions, however, it is desired to accurately measure the gas flow quantity over a wide flow quantity range.

2. Disclosure of Invention

The invention has been achieved in consideration of the above problems and it is an object of the invention to provide a flowmeter capable of accurately measuring a quantity of flow of a fluid such as gas over a wide flow quantity range.

According to the invention, there is provided a flowmeter comprising: a pipe including a flow path through which a fluid passes and in which a measurement zone for smaller quantity of flow and a measurement zone for larger quantity of flow are provided along the longitudinal direction of the flow path; a flow path dividing member provided in the measurement zone for smaller quantity of flow in the flow path of the pipe to divide the flow path into a plurality of narrower flow paths each having a smaller cross-sectional area; a first flow velocity sensor provided in the measurement zone for larger quantity of flow in the flow path of the pipe, for outputting a signal according to the flow velocity of the fluid passing through the measurement zone for larger quantity of flow; a second flow velocity sensor provided in the narrower flow path formed by the flow path dividing member, for outputting a signal according to the flow velocity of the fluid passing through the narrower flow path; and flow quantity calculating means for calculating the quantity of flow on the basis of at least one of the output signal of the first flow velocity sensor and the output signal of the second flow velocity sensor, in accordance with the quantity of flow.

According to the flowmeter of the invention, a signal responsive to the flow velocity of the fluid passing through the zone is outputted from the first flow velocity sensor in the measurement zone for larger quantity of flow. On the other hand, a signal responsive to the flow velocity of the fluid passing through the narrower flow path formed by the flow path dividing member is outputted from the second flow velocity sensor in the measurement zone for smaller quantity of flow. The flow quantity calculating means calculates the quantity of flow on the basis of at least one of the output signal of the first flow velocity sensor and the output signal of the second flow velocity sensor in accordance with the quantity of flow. In the flowmeter, the scale of the flow velocity distribution in the cross section of each narrower flow path (variations in the flow velocity according to places), that is, the degree of a drift is smaller than that of the flow velocity distribution in the cross section of the whole flow path when the flow path dividing means is not disposed. The flow velocity in the narrower flow path near the flow path wall becomes higher as compared with the case where no flow path dividing means is provided.

According to the flowmeter of the invention, the first flow velocity sensor may be attachable to and detachable from the wall face of the pipe. The second flow velocity sensor may be also attachable to and detachable from the wall face of the pipe.

According to the flowmeter of the invention, the second flow velocity sensor may be disposed in the narrower flow path which is the closest to the wall face of the pipe among the plurality of narrower flow paths. The first flow velocity sensor may be disposed near the wall face of the pipe.

In the flowmeter of the invention, the plurality of first flow velocity sensors may further comprise mean flow velocity calculating means for the measurement zone for larger quantity of flow, which calculates a mean value of the flow velocities in the measurement zone for larger quantity of flow on the basis of the output signals of the plurality of first flow velocity sensors and outputs the mean value to the flow quantity calculating means.

In the flowmeter of the invention, the plurality of second flow velocity sensors may further comprise mean flow velocity calculating means for the measurement zone for smaller quantity of flow, which calculates a mean value of the flow velocities in the measurement zone for smaller quantity of flow on the basis of the output signals of the plurality of second flow velocity sensors and outputs the mean value to the flow quantity calculating means.

The flowmeter of the invention may still further comprise a mesh-like flow regulating member in the flow path.

Another flowmeter of the invention further comprises flow velocity increasing means for increasing the flow velocity of the fluid passing through the narrower flow path in which the second flow velocity sensor is provided.

In the flowmeter, the flow velocity increasing means increases the flow velocity of the fluid passing through the narrower flow path in which the second flow velocity sensor is provided. The flow velocity increasing means can be constructed so as to increase the flow velocity of the fluid passing through the narrower flow path by decreasing the space capacity around the second flow velocity sensor in the narrower flow path. The flow velocity increasing means can be constructed by a pair of column-shaped members which are provided upright on both sides of the second flow velocity sensor. The pair of column-shaped members as the flow velocity increasing means may be provided upright on both sides of the second flow velocity sensor in such a manner that the interval between the pair of column-shaped members is widened toward the upstream of the flow path. The second flow velocity sensor may be integrated into a sensor unit with the pair of column-shaped members as the flow velocity increasing means and the sensor unit may be attachable to and detachable from the wall face of the pipe. At least a part of the pair of column-shaped members as the flow velocity increasing means has a streamline shape along the direction of the flow of the fluid, or the pair of column-shaped members as the flow velocity increasing means may be upright columns each having a cross section of a wing shape.

According to the flowmeter, the plurality of first flow velocity sensors may further comprise mean flow velocity calculating means for the measurement zone for larger quantity of flow, which calculates a mean value of the flow velocities in the measurement zone for larger quantity of flow on the basis of the output signals of the plurality of first flow velocity sensors and outputs the mean value to the flow quantity calculating means. The plurality of second flow velocity sensors may further comprise mean flow velocity calculating means for the measurement zone for smaller quantity of flow, which calculates a mean value of the flow velocities in the measurement zone for smaller quantity of flow on the basis of the output signals of the plurality of second flow velocity sensors and outputs the mean value to the flow quantity calculating means.

According to the flowmeter, the second flow velocity sensor may be disposed in the narrower flow path which is closest to the wall face of the pipe among the plurality of narrower flow paths. The first flow velocity sensor may be disposed near the wall face of the pipe.

The flowmeter may further comprise a mesh-like flow regulating member in the flow path.

According to the invention, there is provided a further another flowmeter comprising: a plurality of flow velocity sensors provided in a flow path through which a fluid passes, for outputting signals according to the flow velocity of the fluid; and flow quantity calculating means for calculating the quantity of flow on the basis of at least one of the output signals of the plurality of flow velocity sensors in accordance with the quantity of flow, wherein each of the plurality of flow velocity sensors is prevented from being influenced by the disturbed flow of the fluid caused by the existence of another flow velocity sensor.

In the flowmeter, since each of the plurality of flow velocity sensors is not influenced by the disturbed flow of the fluid caused by the existence of another flow velocity sensor, a stable output signal can be obtained from each of the flow velocity sensors. The quantity of flow is calculated on the basis of at least one of the output signals, so that stable measurement of the quantity of flow can be realized.

According to the flowmeter, the plurality of flow velocity sensors are disposed out of on a straight line along the direction of the flow of the fluid, thereby eliminating the influence of the disturbed flow of the fluid. In this case, the flow disturbed by the existence of the flow velocity sensor on the upstream side does not reach the flow velocity sensor on the downstream side, so that the output signal from the flow velocity sensor on the downstream side is stabilized.

In the flowmeter, in the case where a flow velocity distribution in a flow path cross section perpendicular to the direction of the flow of the fluid is nonuniform in the direction along the circumferential face of flow path walls forming the flow path, preferably, one of the plurality of flow velocity sensors is disposed in the maximum flow velocity position in the flow velocity distribution in the direction along the circumferential face of the flow path wall. In this case, the flow velocity sensor disposed in the maximum flow velocity position can detect the flow velocity with high sensitivity. "The case where a flow velocity distribution in a flow path cross section perpendicular to the direction of the flow of the fluid is nonuniform in the direction along the circumferential face of flow path walls forming the flow path", generally, corresponds to the case where the cross sectional shape of the flow path is not circular.

In the flowmeter, holding units each for holding each of the flow velocity sensors are smoothly embedded in flow path walls forming the flow path without any gap and step, thereby suppressing a disturbance of the flow of the fluid. In this case, since the boundary between the holding units of the flow velocity sensor and the flow path wall is smoothed, when the gas passes there, the flow is not easily disturbed and the influence of the disturbed flow on the other flow velocity sensor is a little.

In the flowmeter, when the positional relation among the plurality of flow velocity sensors is such that one of them is on the upstream side and the other is on the downstream side, it is preferable to further dispose a first mesh-like flow regulating member in the flow path between the flow velocity sensors. According to the flowmeter, the flow of the fluid passed through the flow velocity sensor is regulated by the action of the first mesh-like flow regulating member provided for the flow path between the flow velocity sensors, so that the other fluid sensors are not easily influenced by the disturbed flow.

The flowmeter can be also constructed in such a manner that a part of the plurality of flow velocity sensors is disposed on the upstream side in the flow path, the other flow velocity sensors are disposed on the downstream side in the flow path, and the flow quantity calculating means calculates the quantity of flow in the range of the larger quantity of flow on the basis of output signals of the part of the flow velocity sensors on the upstream side and calculates the quantity of flow in the range of the smaller quantity of flow on the basis of output signals of the other flow velocity sensors on the downstream side. In the flowmeter, the quantity of flow in the range of the larger quantity of flow is calculated on the basis of output signals from the flow velocity sensors disposed upstream and the quantity of flow in the range of the smaller quantity of flow is calculated on the basis of the output signals from the flow velocity sensors disposed on the downstream side. In the range of the smaller quantity of flow, the influence of the disturbed flow caused by the existence of the flow velocity sensors on the upstream side is not easily exerted on the flow velocity sensors on the downstream side. Consequently, an output signal from the flow velocity sensor disposed on the downstream side is not unstable.

According to the flowmeter, a flow path dividing member for dividing the flow path into a plurality of narrower flow paths each having a smaller cross-sectional area may be further disposed in the flow path.

In the flowmeter, a second mesh-like flow regulating member may be further disposed in the flow path on the upstream side of the plurality of flow velocity sensors. In the flowmeter, at least the flow of the fluid passing through the flow velocity sensor on the most upstream side is regulated by the action of the second mesh-like flow regulating member.

In the flowmeter, at least a part of the plurality of flow velocity sensors may be disposed near the wall face of the flow path.

Other and further objects, features and advantages of the invention will appear more fully from the following description.

BRIEF DESCRIPTION OF DRAWINGS

FIG. 10 is an explanatory diagram showing an example of the relation between sensor output values of a flow velocity sensor for a smaller quantity of flow of the flowmeter illustrated in FIG. 6 and measurement conditions.

BEST MODE FOR CARRYING OUT THE INVENTION

Embodiments of the invention will be described in detail hereinbelow with reference to the drawings.

First Embodiment

With reference to FIGS. 1 to 5, a first embodiment of the invention will be described.

Figure 1:
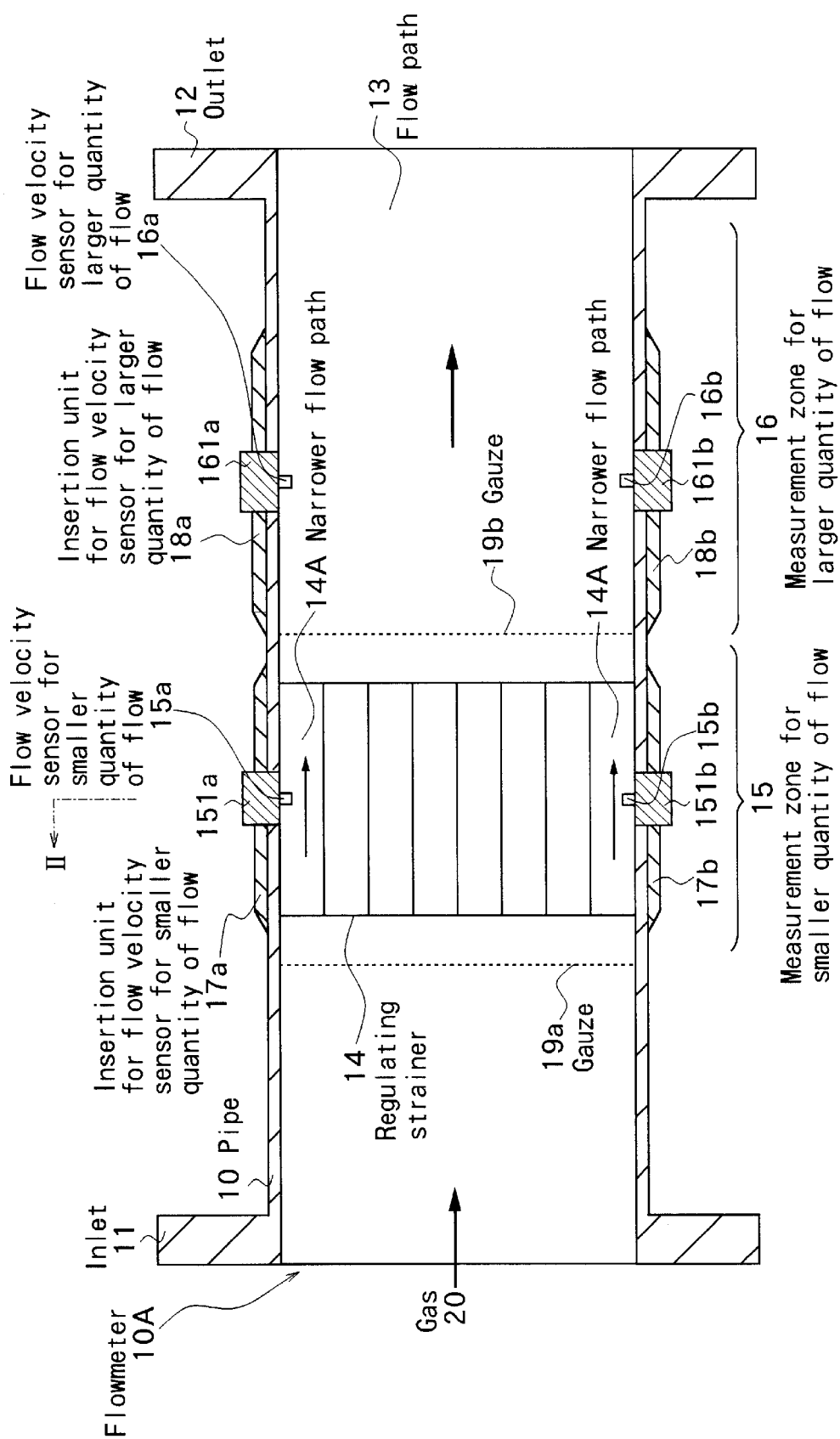
FIG. 1 is a longitudinal cross section showing a schematic configuration of a flowmeter according to a first embodiment of the invention.
Figure 2:
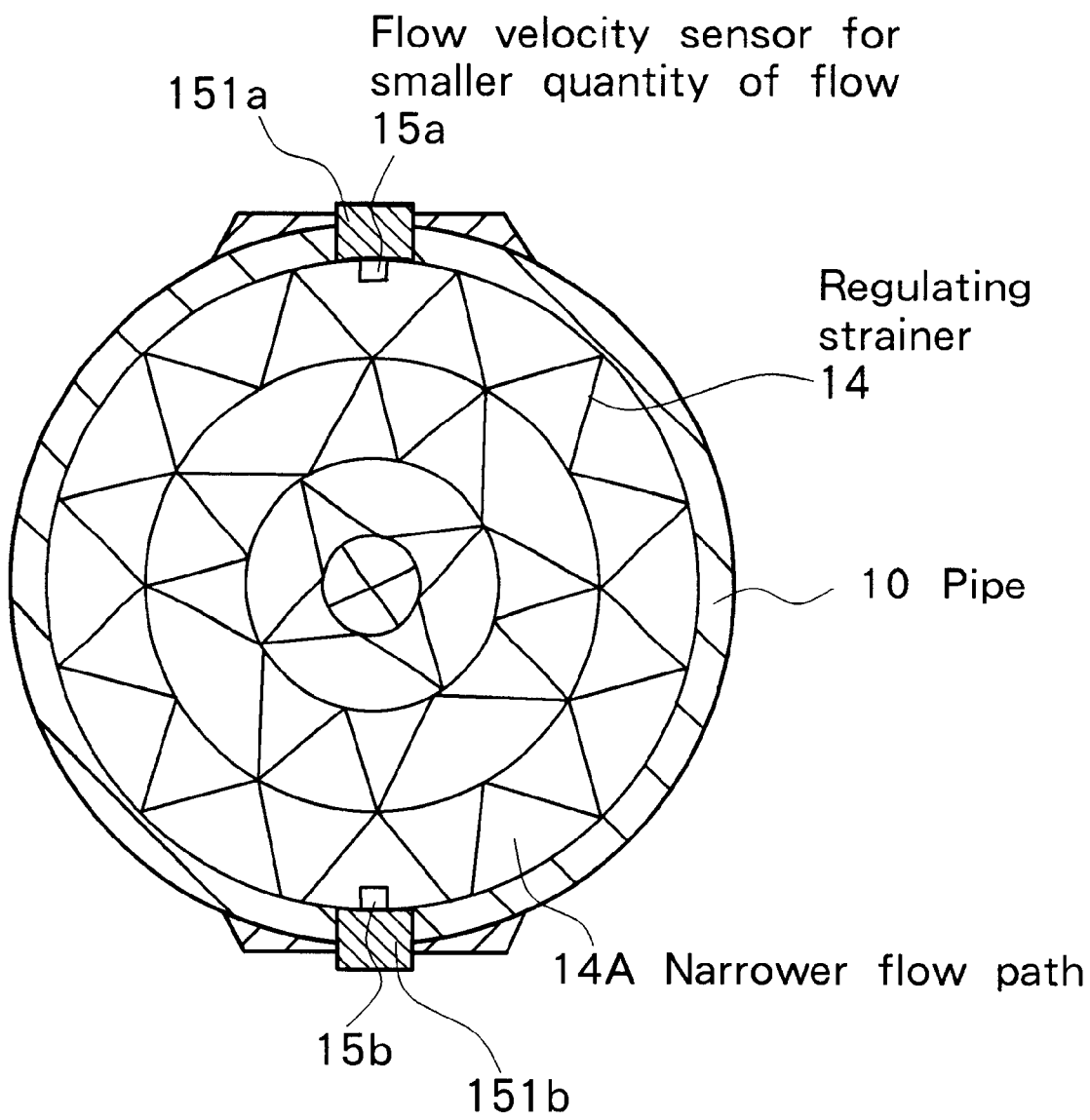
FIG. 2 is a cross section in the direction which perpendicularly crosses the longitudinal direction of the flowmeter of FIG. 1.

FIG. 1 shows the configuration in longitudinal cross section of a flowmeter according to an embodiment of the invention. FIG. 2 shows the configuration in cross section taken along line II—II of FIG. 1. The flowmeter according to the embodiment is used as a gas meter. This flowmeter 10A comprises a pipe 10 having an inlet 11 for receiving a gas 20 and an outlet 12 for exhausting the gas 20. The diameter of a flow path 13 in the pipe 10 is, for example, 50 mm. In the flow path 13, along the longitudinal direction, a measurement zone 15 for smaller quantity of flow on the upstream side and a measurement zone 16 for larger quantity of flow on the downstream side are provided. In the measurement zone 15 for smaller quantity of flow, a regulating strainer 14 for regulating and straightening the flow of the gas 20 and suppressing occurrence of a drift is provided. The regulating strainer 14 corresponds to an example of "flow path dividing member" in the invention.

As shown in FIG. 2, by partitions, the regulating strainer 14 partitions the flow path 13 in the measurement zone 15 for smaller quantity of flow into a plurality of narrower flow paths 14A each having a cross-section area smaller than that of the flow path 13. The gas 20 flows through the divided narrower flow paths 14A. The shape in cross section of the narrower flow path 14A may be not only the triangular shape as shown in FIG. 2 but also another shape such as a rectangular shape, a wave shape, or a hexagonal shape.

In the pipe 10 in the measurement zone 15 for smaller quantity of flow, insertion units 17a and 17b for flow velocity sensors for smaller quantity of flow are provided so as to face each other (in the upper and lower positions in the diagram). In the insertion units 17a and 17b for velocity sensors for smaller quantity of flow, flow velocity sensors 15a and 15b for smaller quantity of flow held by sensor holding units 151a and 151b are fit, respectively. A sensing part (not shown) at the tip of each of the flow velocity sensors 15a and 15b for smaller quantity of flow faces the center part of the narrower flow path 14A which is the closest to the wall face among the plurality of narrower flow paths 14A formed by the regulating strainer 14.

On the other hand, in the pipe 10 in the measurement zone 16 for larger quantity of flow, insertion units 18a and 18b for flow velocity sensors for larger quantity of flow are provided so as to face each other (in the upper and lower positions in the diagram). In the insertion units 18a and 18b for flow velocity sensors for larger quantity of flow, flow velocity sensors 16a and 16b for larger quantity of flow as first flow velocity sensors are fit in a state where they are held by sensor holding units 161a and 161b, respectively.

The flow velocity sensors 15a and 15b for smaller quantity of flow are used to measure the quantity of flow in the range of the smaller quantity of flow and the flow velocity sensors 16a and 16b for larger quantity of flow are used to measure the quantity of flow in the range of the larger quantity of flow. Each of the flow velocity sensors 15a and 15b for smaller quantity of flow corresponds to an example of "second flow velocity sensor" in the invention and each of the flow velocity sensors 16a and 16b for larger quantity of flow corresponds to an example of "first flow velocity sensor" in the invention.

Each of the flow velocity sensors 15a and 15b for smaller quantity of flow and the flow velocity sensors 16a and 16b for larger quantity of flow has, for example, although not shown, a heating unit and two temperature sensors disposed on the upstream and downstream sides of the heating unit. In this case, the quantity of flow corresponding to the flow velocity can be obtained from a power supplied to the heating unit necessary to keep the difference between the temperatures sensed by the two temperature sensors constant or the flow velocity can be obtained from the difference between the temperatures sensed by the two temperature sensors by heating the heating unit with a constant current or constant power.

The flow path 13 on the upstream side of the flow velocity sensors 15a and 15b for smaller quantity of flow is provided with a gauze 19a for regulating and straightening the flow and the flow path 13 between the flow velocity sensors 15a and 15b for smaller quantity of flow and the flow velocity sensors 16a and 16b for larger quantity of flow is provided with a gauze 19b for regulating and straightening the flow. For example, #100 mesh or the like is used as each of the gauzes 19a and 19b.

Figure 3:
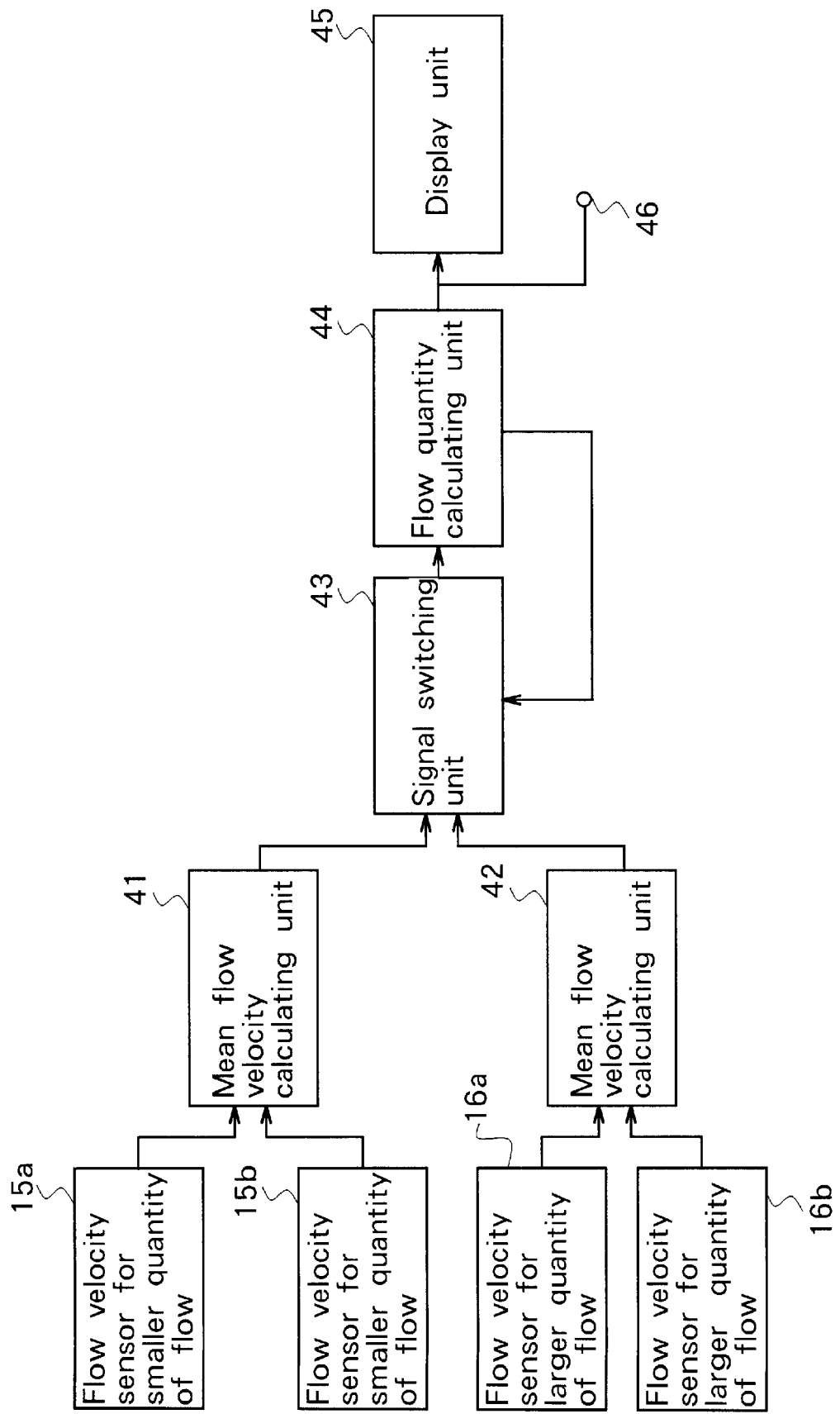
FIG. 3 is a block diagram showing the circuit configuration of the flowmeter of FIG. 1.

FIG. 3 shows the circuit configuration of a gas meter to which the flowmeter 10A is applied. The circuit comprises: a mean flow velocity calculating unit 41 for calculating a mean value of the flow velocities in the narrower flow paths 14A formed by the regulating strainer 14 on the basis of output signals from the flow velocity sensors 15a and 15b for smaller quantity of flow; and a mean flow velocity calculating unit 42 for calculating a mean value of the flow velocities in the measurement zone 16 for larger quantity of flow on the basis of output signals from the flow velocity sensors 16a and 16b for larger quantity of flow. The circuit also comprises: a signal switching unit 43 for selecting one of the output of the mean flow velocity calculating unit 41 and the output of the mean flow velocity calculating unit 42 in accordance with the quantity of flow; a display unit 45 for displaying the quantity of flow of the gas and an integrated quantity of flow on the basis of the output of the signal switching unit 43; and an external output terminal 46 for outputting the quantity of flow calculated by the quantity of flow calculating unit 44 and an integrated quantity of flow to the outside. Mainly, the mean flow velocity calculating units 41 and 42 and the flow quantity calculating unit 44 correspond to an example of "flow quantity calculating means" in the invention.

The signal switching unit 43 outputs the output of the mean flow velocity calculating unit 41 to the flow quantity calculating unit 44 when the quantity of flow calculated by the flow quantity calculating unit 44 is in a preset range of the smaller quantity of flow. The signal switching unit 43 outputs the output of the mean flow velocity calculating unit 42 to the low quantity calculating unit 44 when the quantity of flow calculated by the flow quantity calculating unit 44 is in a preset range of the larger quantity of flow. When the quantity of flow is in the preset range of the smaller quantity of flow, the flow quantity calculating unit 44 calculates the quantity of flow by multiplying the mean value of the flow velocities as an output of the mean flow velocity calculating unit 41 by a pipe shape coefficient corresponding to the narrower flow path 14A in the regulating strainer 14. When the quantity of flow is in the preset range of the larger quantity of flow, the flow quantity calculating unit 44 calculates the quantity of flow by multiplying the mean value of the flow velocities as an output of the mean flow velocity calculating unit 42 by the pipe shape coefficient corresponding to the flow path 13 on the downstream side of the regulating strainer 14.

In the case where the range of the smaller quantity of flow and the range of the larger quantity of flow are partially overlapped with each other and the quantity of flow becomes higher, when the quantity of flow reaches the upper limit of the overlapped range, the quantity of flow may be calculated by switching the output of the mean flow velocity calculating unit 41 to the output of the mean flow velocity calculating unit 42. In the case where the quantity of flow goes low, when the quantity of flow reaches the lower limit of the overlapped range, the quantity of flow may be calculated by switching the output of the mean flow velocity calculating unit 42 to the output of the mean flow velocity calculating unit 41. Each of the mean flow velocity calculating units 41 and 42, signal switching unit 43, and flow quantity calculating unit 44 can be constructed by, for example, a microcomputer.

The actions of the flowmeter 10A having the configuration as described above and the gas meter to which the flowmeter 10A is applied will now be described.

The gas 20 taken from the inlet 11 first passes through each of the plurality of narrower flow paths 14A in the regulating strainer 14 in the measurement zone 15 for smaller quantity of flow. At this time, each of the flow velocity sensors 16a and 15b for smaller quantity of flow outputs a signal according to the flow velocity of the gas 20. The gas 20 which has passed the measurement zone 15 for smaller quantity of flow passes through the measurement zone 16 for larger quantity of flow and is exhausted from the outlet 12. At that time, each of the flow velocity sensors 16a and 16b for larger quantity of flow outputs a signal according to the flow velocity of the gas 20 passing through the measurement zone 16 for larger quantity of flow.

The mean flow velocity calculating unit 41 calculates the mean value of the flow velocities in the narrower flow paths 14A on the basis of output signals of the flow velocity sensors 15a and 15b for smaller quantity of flow in the narrower flow paths 14A in the regulating strainer 14. The mean flow velocity calculating unit 42 calculates the mean value of the flow velocities in the measurement zone 16 of larger quantity of flow on the basis of output signals of the flow velocity sensors 16a and 16b for larger quantity of flow in the measurement zone 16 for larger quantity of flow. The signal switching unit 43 outputs the output of the mean flow velocity calculating unit 41 to the flow quantity calculating unit 44 when the quantity of flow calculated by the flow quantity calculating unit 44 is in the preset range for smaller quantity of flow. The signal switching unit 43 outputs the output of the mean flow velocity calculating unit 42 to the flow quantity calculating unit 44 when the quantity of flow calculated by the flow quantity calculating unit 44 is in the preset range of the larger quantity of flow. The flow quantity calculating unit 44 calculates the quantity of flow and the integrated quantity of flow on the basis of the mean value of the flow velocities as an output of the mean flow velocity calculating unit 41 when the quantity of flow is in the preset range for smaller quantity of flow. The flow quantity calculating unit 44 calculates the quantity of flow and the integrated quantity of flow on the basis of the mean value of the flow velocities as an output of the mean flow velocity calculating unit 42 when the quantity of flow is in the preset range of the larger quantity of flow. The integrated quantity of flow calculated by the flow quantity calculating unit 44 is displayed on the display unit 45. It is also possible to partially overlap the range of the smaller quantity of flow and the range of the larger quantity of flow, obtain the mean value of the quantity of flow calculated on the basis of the mean value of the flow velocities as an output of the mean flow velocity calculating unit 41 and the quantity of flow calculated on the basis of the mean value of the flow velocities as an output of the mean flow velocity calculating unit 42 and use the obtained mean value as a measured quantity of flow.

The characteristic action of the invention will now be described.

Figure 4:
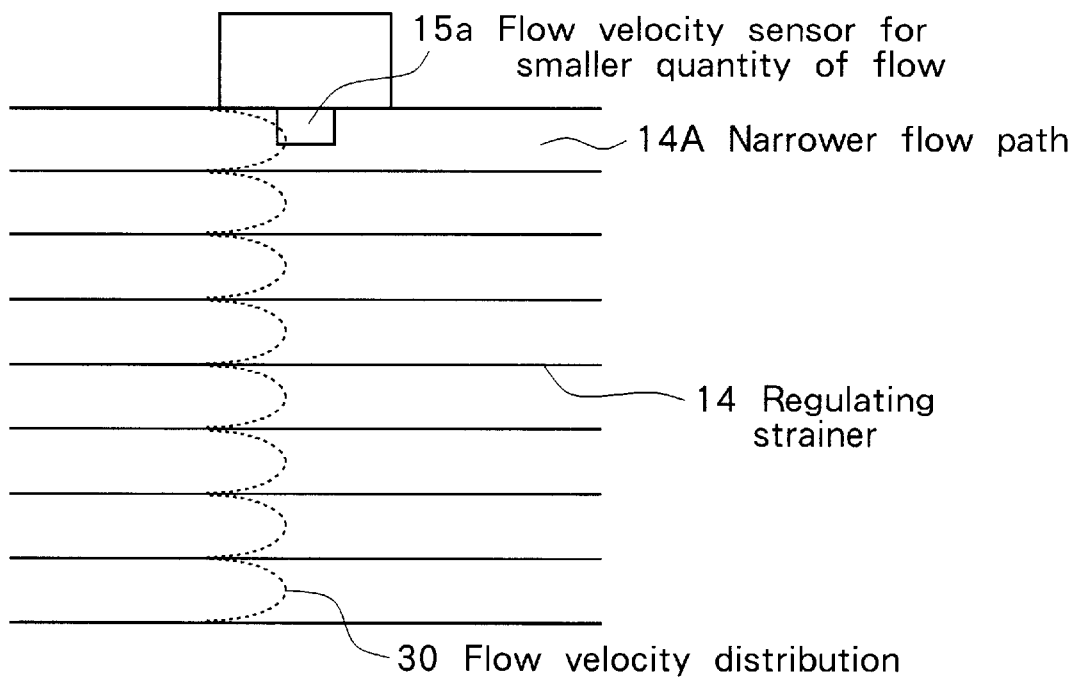
FIG. 4 is an explanatory diagram schematically showing a distribution of flow velocities in a flow path when a regulating strainer is attached in the flowmeter.
Figure 5:
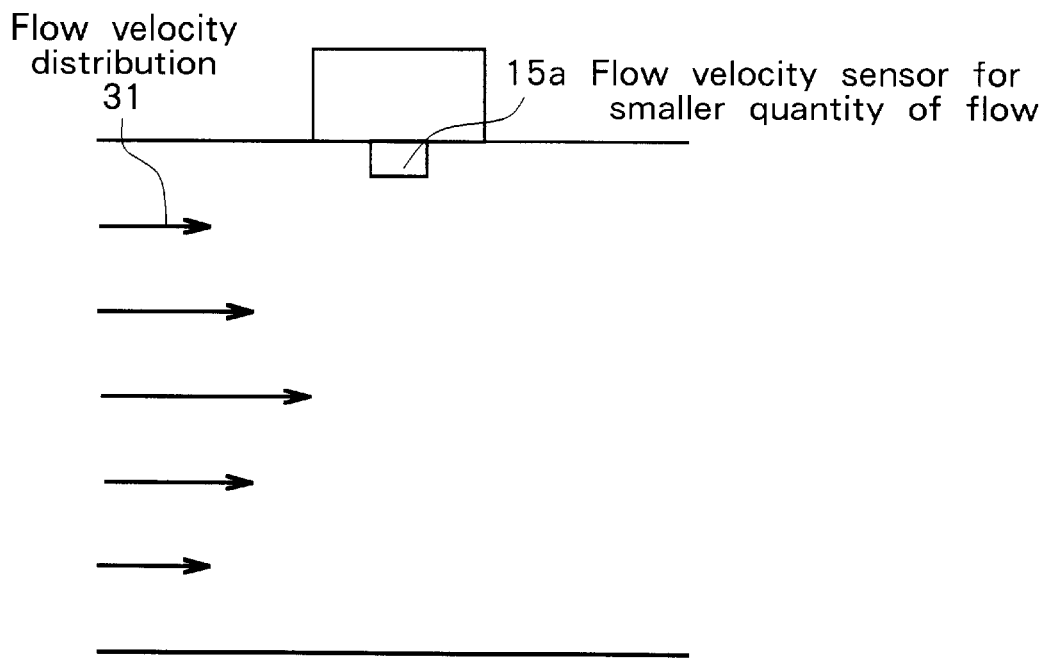
FIG. 5 is an explanatory diagram schematically showing a distribution of flow velocities in a flow path when a regulating strainer is not attached in the flowmeter.

FIGS. 4 and 5 are used to explain the difference between a flow velocity distribution when the regulating strainer 14 is used and that when the regulating strainer 14 is not used. FIG. 4 shows a flow velocity distribution 30 when the regulating strainer 14 is disposed as in the embodiment. FIG. 5 shows a flow velocity distribution 31 in the flow path 13 when no regulating strainer 14 is used as a comparative example.

Generally, the flow velocities are distributed in such a manner that the flow velocity is the fastest in the center of the flow path and becomes slower toward the wall face and what is called a drift occurs. Particularly, the degree of a drift is high in the range of the smaller quantity of flow. Even when the flow is detected in the flow path center part, there is the case such that a flow is not detected near the wall face of the flow path. Specifically, the flow velocity distribution in the flow path 13 when the regulating strainer 14 is not provided in the measurement zone 15 for smaller quantity of flow is, for example, as shown in FIG. 5. In the diagram, the length of the arrow 31 shows the degree of the flow velocity. As shown in the diagram, when the flow velocity sensors 15a and 15b for smaller quantity of flow are attached to the wall face, the flow velocity sensors 16a and 15b for smaller quantity of flow measure the slowest flow velocity in the flow velocity distribution 31. Depending on the quantity of flow, there is a case such that the flow velocity cannot be detected. The flow quantity measurable range, especially on the lower limit side, is therefore narrowed.

On the contrary, when the regulating strainer 14 is provided as shown in FIG. 4, each of the narrower flow paths 14A defined by the regulating strainer 14 has the flow velocity distribution 30 in which the flow velocity is fast in the center but slow in the peripheral part. Moreover, there is hardly any difference between the mean flow velocity in the narrower flow path 14A in the center of the flow path 13 and that in the narrower flow path 14A in the peripheral part. That is, the mean flow velocity in the narrower flow path 14A closest to the wall face of the pipe 10 in the case where the regulating strainer 14 is provided is considerably faster than that near the wall face of the pipe 10 in the case where the regulating strainer 14 is not provided (FIG. 5). The measurement sensitivity of the flow velocity sensors 15a and 15b for smaller quantity of flow in FIG. 4 is higher than that of the flow velocity sensors 15a and 15b for smaller quantity of flow in FIG. 5. Thus, the quantity of flow measurable range on the lower limit side is expanded.

More specifically, as described above, when the sensing part at the tip of each of the flow velocity sensors 15a and 15b for smaller quantity of flow is disposed so as to be positioned around the center of the narrower flow path 14A which is the closest to the wall face of the pipe 10, the peak value of the flow velocity distribution 30 in the narrower flow path is detected. Consequently, the measurement sensitivity is further improved and the measurable range of the quantity of flow on the lower limit side is further enlarged.

Figure 29:
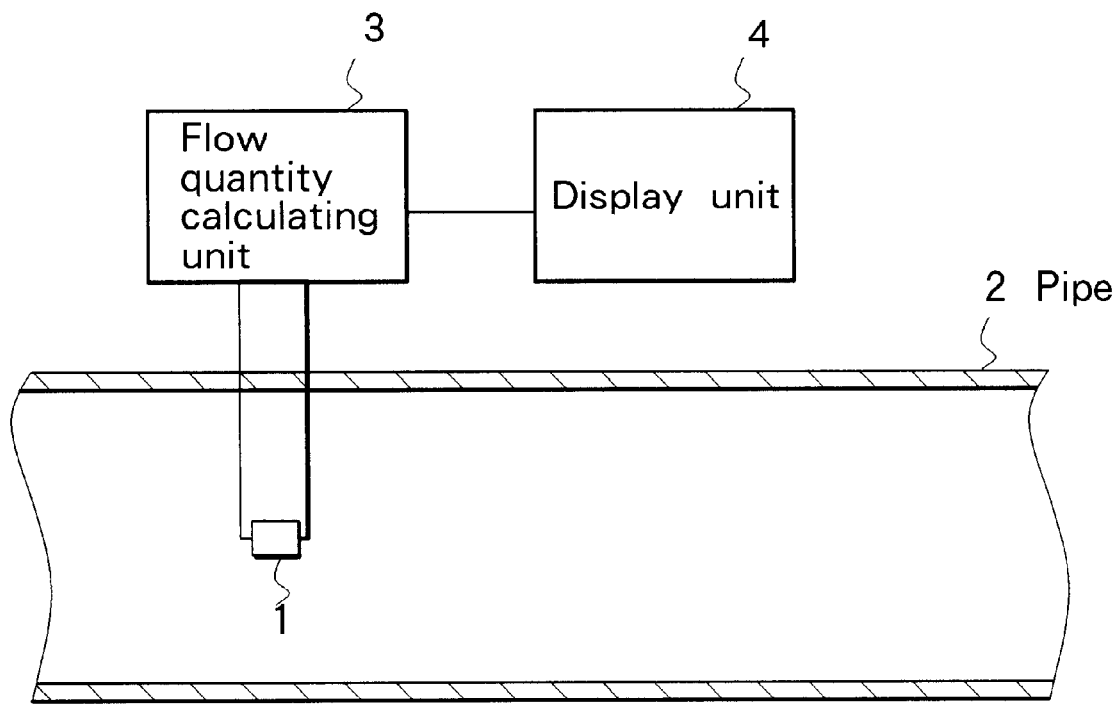
FIG. 29 is a cross section showing a schematic configuration of a conventional flowmeter.

Even when the flow velocity sensor 1 (FIG. 29) is not disposed in the center part of the flow path as in the conventional technique but the flow velocity sensors 15a and 15b for smaller quantity of flow are disposed on or near the wall face of the pipe 10, sufficient measurement sensitivity can be obtained and the measurable range of the quantity of flow can be sufficiently assured.

Since the flow velocity sensors 16a and 16b for larger quantity of flow disposed in the measurement zone 16 for larger quantity of flow are used to measure the flow velocity of the gas in the range of the larger quantity of flow, their measurement sensitivity is assured. The gauze 19b for regulating the flow is disposed on the immediate upstream side of the measurement zone 16 for larger quantity of flow, so that a disturbed flow is suppressed. The regulating strainer is not therefore especially needed in the measurement zone 16 for larger quantity of flow. As necessary, the regulating strainer can be disposed also in the measurement zone 16 for larger quantity of flow.

As mentioned above, in the flowmeter according to the embodiment, the flow velocity sensors 15a and 15b for smaller quantity of flow are disposed in the narrower flow paths 14A divided by the regulating strainer 14 and the detecting part at the tip of each of the flow velocity sensors 15a and 15b for smaller quantity of flow is positioned in the center part of the narrower flow path 14A, so that the flow velocity measurement with high sensitivity can be performed also in the range of the smaller quantity of flow. The mounting position of the flow velocity sensor is not limited to a part around the center of the flow path even in the range of the smaller quantity of flow in which a drift easily occur substantially unlike in the conventional technique, but the mounting position can be arbitrarily selected. That is, even when the flow velocity sensor is disposed near the pipe wall to which the mounting is easy, the smaller quantity of flow does not become insensible. The measurable range of the quantity of flow can be substantially enlarged. Since the occurrence of the disturbed flow in the space in which the flow velocity sensors 15a and 15b for smaller quantity of flow are disposed is suppressed by the flow regulating action of the regulating strainer 14 and the gauze 19a, the accuracy of the quantity of flow measurement is improved.

When the flowmeter is applied to the gas meter, high-accuracy measurement can be realized over a wide range of the quantity of flow from the range of the smaller quantity of flow to the range of the larger quantity of flow. Especially, when the flowmeter is applied to a gas meter having the safety function which senses an abnormal gas using state and preventing an accident, the accurate operation of the safety function can be assured.

In the embodiment, by providing the regulating strainer 14, the flow velocity sensors 15a and 15b for smaller quantity of flow can be disposed on or very close to the wall face of the pipe 10 while assuring the sensitivity of the flow velocity measurement. Consequently, each of the sensors can be relatively easily formed in a detachable sensor unit. When such a detachable sensor unit is used, the line connection between each of the sensors and the measurement circuit part of the gas meter body becomes easier. Further, when a trouble occurs, for example, in any of the flow velocity sensors 15a and 15b for smaller quantity of flow, the flow velocity sensors 16a and 16b for larger quantity of flow, and the like, it is sufficient to replace only the sensor unit without disassembling the whole flow path 13, so that the maintainability is improved. This point is similar with respect to the flow velocity sensors 16a and 16b for larger quantity of flow.

Second Embodiment

With reference to FIGS. 6 to 14, a second embodiment of the invention will be described.

Figure 6:
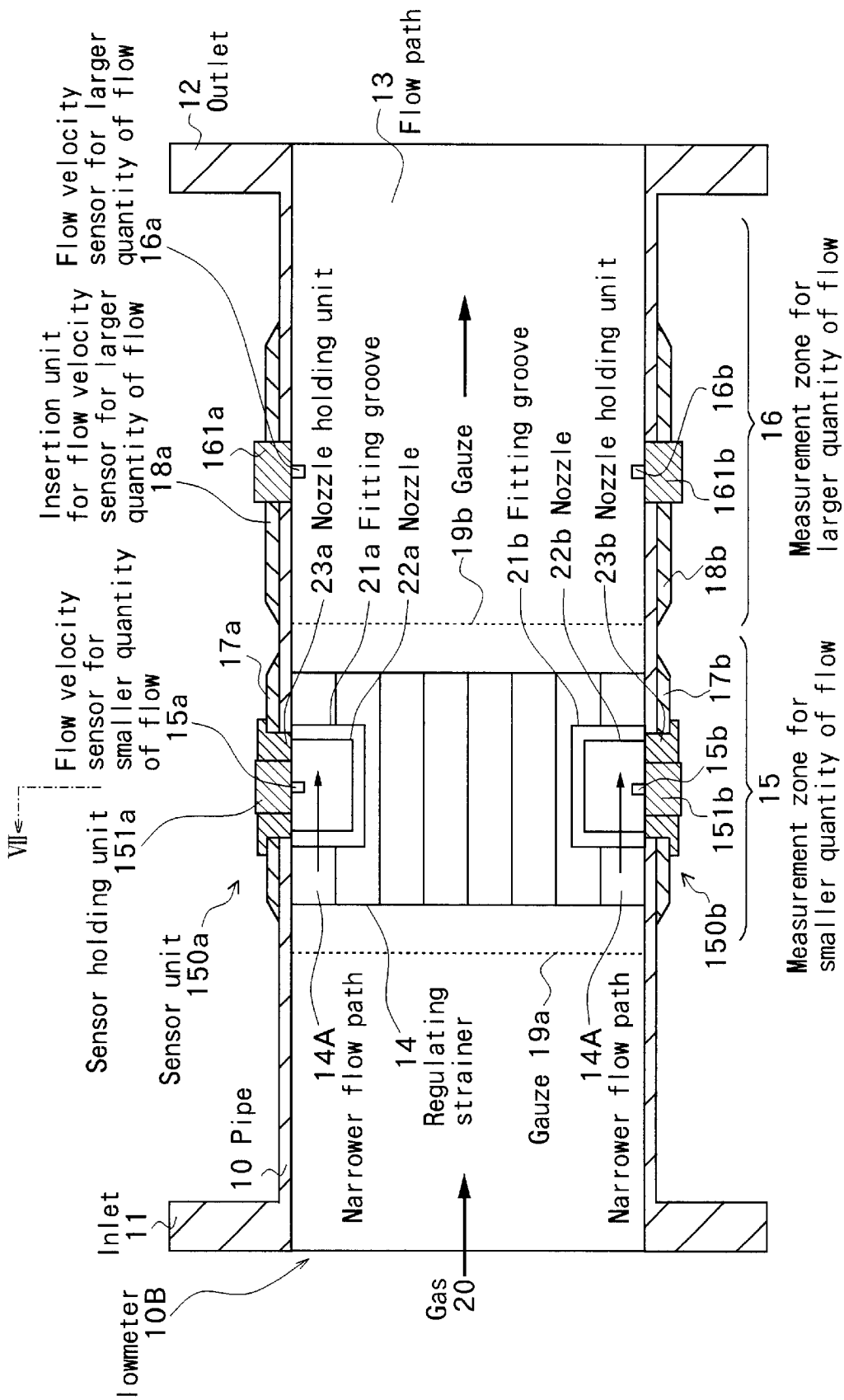
FIG. 6 is a longitudinal cross section schematically showing the construction of a flowmeter according to a second embodiment of the invention.
Figure 7:
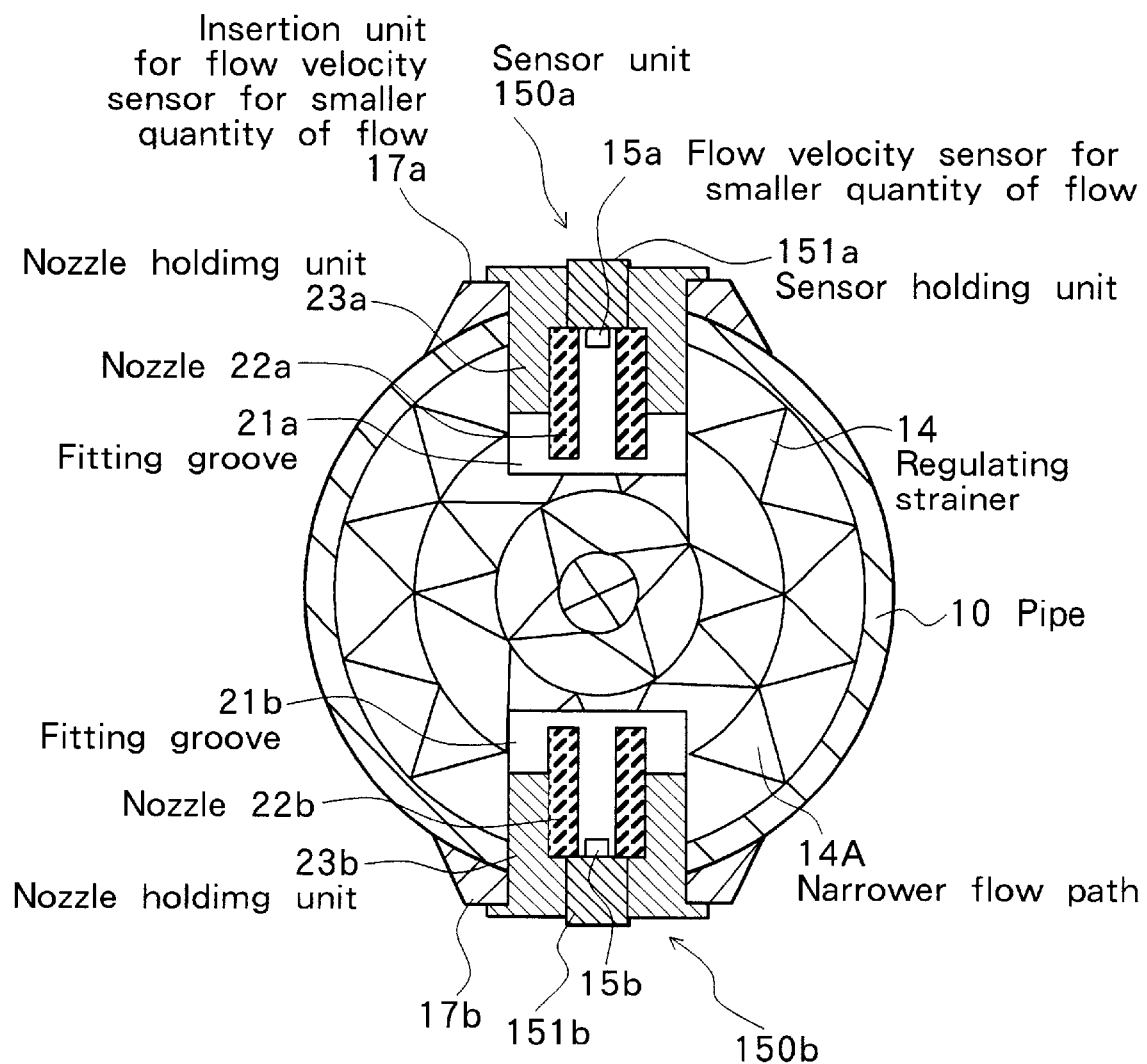
FIG. 7 is a cross section in the direction which perpendicularly crosses the longitudinal direction in the flowmeter of FIG. 6.

FIG. 6 shows the configuration in longitudinal cross section of a flowmeter according to a second embodiment of the invention. FIG. 7 shows the configuration in cross section taken along line VII—VII of FIG. 6. The same reference numerals are designated to the same components as those shown in FIGS. 1 and 2 and the description is omitted here as appropriate. In a flowmeter 10B according to the embodiment, sensor units 150a and 150b including the flow velocity sensors 15a and 15b for smaller quantity of flow as second flow velocity sensors are detachably fit in the insertion units 17a and 17b for flow velocity sensors for smaller quantity of flow. In the regulating strainer 14, for example, fitting grooves 21a and 21b each having the depth of about 15 mm and the length in the longitudinal direction of about 27 mm are provided in parts corresponding to the fitting parts in the sensor units 150a and 150b.

The sensor unit 150a includes a nozzle 22a as a flow velocity increasing means for increasing the flow velocity of the gas 20 passing through the narrower flow path 14A for which the flow velocity sensor 16a for smaller quantity of flow is provided, a nozzle holding unit 23a for holding the nozzle 22a, and a sensor holding unit 151a for holding the flow velocity sensor 15a for smaller quantity of flow. The sensor unit 150b includes a nozzle 22b as a flow velocity increasing means for increasing the flow velocity of the gas 20 passing through the narrower flow path 14A for which the flow velocity sensor 15b for smaller quantity of flow is provided, a nozzle holding unit 23b for holding the nozzle 22b, and a sensor holding unit 151b for holding the flow velocity sensor 15b for smaller quantity of flow.

In the sensor unit 150a, all of the nozzle 22a, nozzle holding unit 23a, flow velocity sensor 15a for smaller quantity of flow, and sensor holding unit 151a are integrally formed. In the sensor unit 150b, all of the nozzle 22b, nozzle holding unit 23b, flow velocity sensor 15b for smaller quantity of flow, and sensor holding unit 151b are integrally formed. By constructing each of the sensor units 150a and 150b by integrating the elements as mentioned above and detachably attaching the sensor units 150a and 150b to the insertion units 17a and 17b for flow velocity sensors for smaller quantity of flow, the attachment/detachment of the elements to/from the pipe 10 is facilitated. All of the elements of each of the sensor units 150a and 150b may not be integrated and each of them can be constructed so as to be separated.

Figure 8:
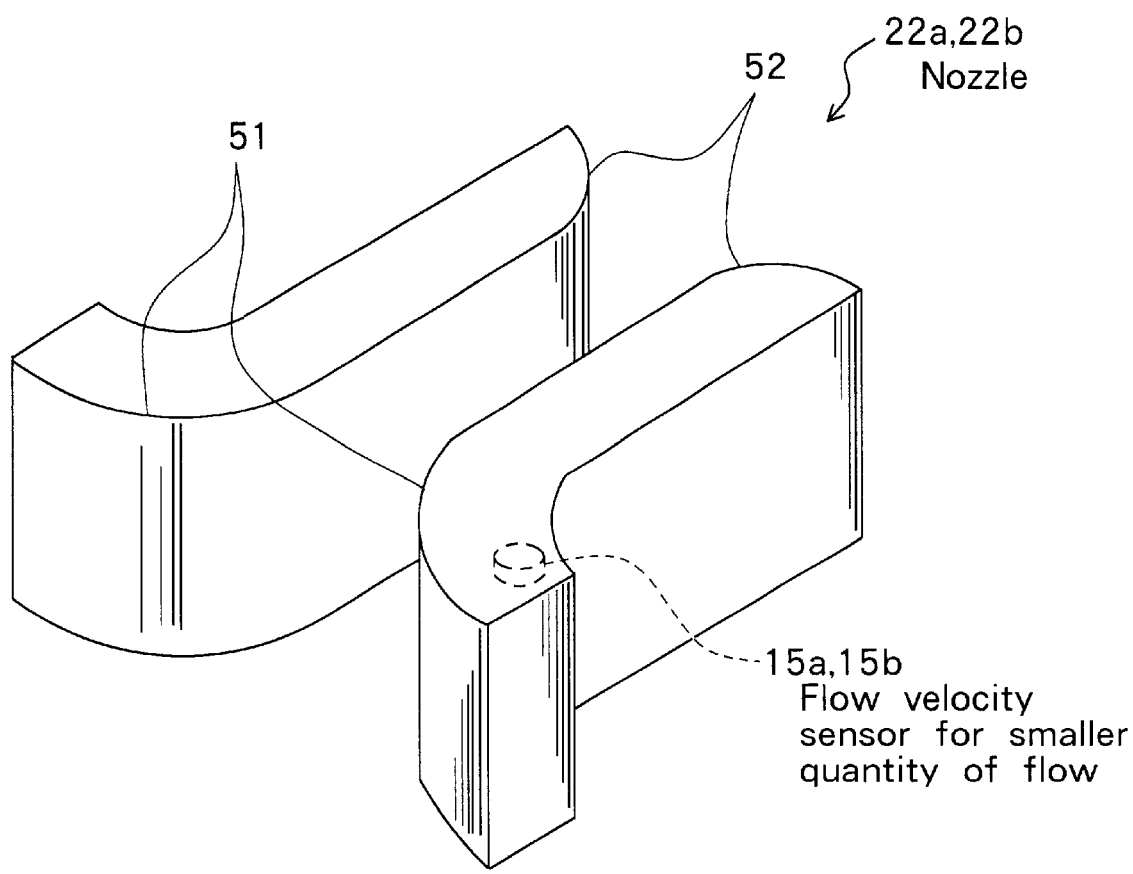
FIG. 8 is a perspective view of an example of a detailed configuration of a nozzle in the flowmeter shown in FIG. 6.

The flow velocity sensors 15a and 15b for smaller quantity of flow are constructed so that the sensing part at the tip of each of the sensors 15a and 15b is located in the center part of the narrower flow path 14A which is the closest to the wall face among the plurality of narrower flow paths 14A defined by the regulating strainer 14. The nozzles 22a and 22b are positioned in the fitting grooves 21a and 21b formed in the regulating strainer 14. As shown in FIG. 8 which will be described hereinlater, each of the nozzles 22a and 22b has a shape such that the space capacity in each of the fitting grooves 21a and 21b gradually decreases from the upstream side towards the downstream side. That is, the space capacity around each of the flow velocity sensors 15a and 15b for smaller quantity of flow in the narrower flow path 14A gradually decreases from the upstream side towards the downstream side, thereby enabling the flow velocity of the gas 20 passing through the narrower flow path 14A to be increased.

Figure 9:
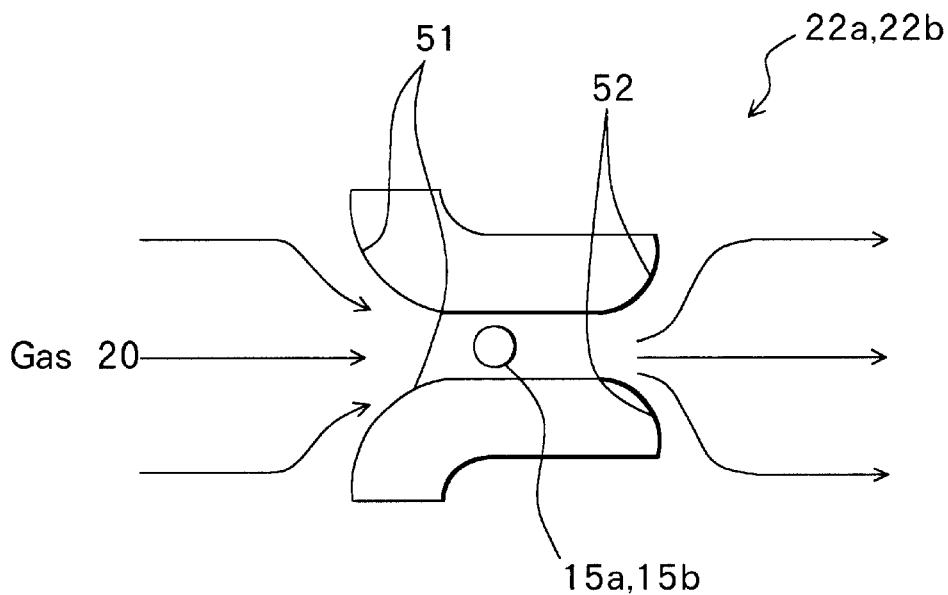
FIG. 9 is a plan view showing the action of the nozzle illustrated in FIG. 8.

FIGS. 8 and 9 are explanatory diagrams showing an example of the detailed configuration of each of the nozzles 22a and 22b. As shown in the diagrams, each of the nozzles 22a and 22b is comprised of a pair of column-shaped members provided upright on both sides of each of the flow velocity sensors 15a and 15b for smaller quantity of flow. The pair of column-shaped members constructing each of the nozzles 22a and 22b are provided upright on both sides of each of the flow velocity sensors 15a and 15b for smaller quantity of flow so that the interval between front end parts 51 of the members is gradually widened toward the upstream of the narrower flow path 14A. Consequently, it makes the gas 20 whose flow velocity is increased easily pass between the pair of column-shaped members. The height of each of the nozzles 22a and 22b is, for example, about 10 mm. As a material of the nozzles 22a and 22b, for example, a metal such as aluminium or stainless steel, resin, or the like is applied.

It is preferable that at least the inside (the side to which the flow velocity sensor 15a or 15b for smaller quantity of flow is provided) of the front end part 51 or the rear end part 52 of each of the nozzles 22a and 22b has a streamline shape. By streamlining the front end part 51, as shown in FIG. 9, the gas 20 is easily led through the nozzle 22a or 22b and it makes the flow velocity of the gas 20 easily increase. By streamlining the rear end parts 52, the gas 20 led between the nozzle 22a or 22b easily passes through the rear end parts 52 so that it prevents the gas 20 from being stagnated in the rear end parts 52.

The other configurations of the flowmeter 10B are similar to those of the first embodiment. The configuration of the circuit part of the gas meter to which the flowmeter 10B according to the embodiment is applied is similar to the circuit configuration (FIG. 3) in the first embodiment. In the second embodiment, however, when the quantity of flow is in the preset range of the smaller quantity of flow, the flow quantity calculating unit 44 calculates the quantity of flow by multiplying the mean value of the flow velocities as an output of the mean flow velocity calculating unit 41 by not only the pipe shape coefficient corresponding to the narrower flow path 14A in the regulating strainer 14 but also a correction coefficient corresponding to the shape of the nozzle 22a or 22b.

The action of the flowmeter 10B according to the embodiment will now be explained.

The gas 20 supplied from the inlet 11 first passes through the plurality of narrower flow paths 14A in the regulating strainer 14 in the measurement zone 15 for smaller quantity of flow. At this time, the regulating strainer 14 acts in a manner similar to the case of the first embodiment (FIG. 4) to increase the flow velocity near the pipe wall. A part of the gas 20 passing through the plurality of narrower flow paths 14A reaches the nozzles 22a and 22b provided upright on both sides of the flow velocity sensors 15a and 15b for smaller quantity of flow. When the gas 20 reaches the nozzles 22a and 22b, the flow velocity of the gas 20 is increased by the action of the nozzles 22a and 22b. The gas 20 whose flow velocity is increased passes through the flow velocity sensors 15a and 15b for smaller quantity of flow provided in the center of the nozzles 22a and 22b, respectively, on the inner wall surface of the flow path 13. At this time, the flow velocity sensors 15a and 15b for smaller quantity of flow output signals according to the flow velocity of the gas 20 increased by the nozzles 22a and 22b. The gas 20 which passed through the measurement zone 15 for smaller quantity of flow passes through the measurement zone 16 for larger quantity of flow and is exhausted from the outlet 12. At this time, the flow velocity sensors 16a and 16b for larger quantity of flow output signals according to the flow velocity of the gas 20 passing through the measurement zone 16 for larger quantity of flow. Since the operation related to subsequent signal processes is similar to that of the case of the first embodiment, its description is omitted here.

FIG. 10 is an explanatory diagram showing an example of the sensor output value measured when changing the measurement conditions in the flow velocity sensors 15a and 15b for smaller quantity of flow. In the diagram, the measurement results obtained when the measurement conditions are changed in four ways are shown. Measurement conditions B to D denote the case where the nozzles 22a and 22b are provided near the flow velocity sensors 15a and 15b for smaller quantity of flow and the flow velocity is measured. A measurement condition A denotes the case where the flow velocity is measured without providing the nozzles 22a and 22b (corresponding to the case where the height of each of the nozzles 22a and 22b is 0).

In the measurement conditions B to D, the cases where the nozzle 22a whose height is about 10 mm and the nozzle 22b whose height is about 7 mm from the sensing parts of the flow velocity sensors 15a and 15b for smaller quantity of flow are fit into the fitting grooves 21a and 21b having the depth of about 11.5 mm from the sensing parts of the flow velocity sensors 15a and 15b for smaller quantity of flow are shown. That is, according to the measurement conditions B to D, the nozzle 22a having the height of about 10 mm is attached near the flow velocity sensor 15a for smaller quantity of flow and the nozzle 22b having the height of about 7 mm is attached near the other flow velocity sensor 15b for smaller quantity of flow. Under the measurement condition D, sensor output values of the flow velocity sensors 15a and 15b for smaller quantity of flow are simultaneously observed. Under the measurement condition C, by closing the flow velocity sensor 15b for smaller quantity of flow to which the nozzle 22b is attached with a closing lid, the sensor output value from the flow velocity sensor 15a for smaller quantity of flow to which the nozzle 22a having the height of about 10 mm is attached is observed. Under the measurement condition B, by closing the flow velocity sensor 15a for smaller quantity of flow to which the nozzle 22a is attached with a closing lid, a sensor output value from the flow velocity sensor 15b for smaller quantity of flow to which the nozzle 22b having the height of about 7 mm is attached is observed. In any of the measurement conditions A to D, the gas 20 used for measurement is air and the diameter of the flow path 13 in the pipe 10 is about 56 mm. When the gas 20 with a very low quantity of flow (quantity of flow corresponding to 5 litters per hour) is introduced, the sensor output value shown in FIG. 10 indicates a value of a net pulse outputted from the flow velocity sensors 15a and 15b for smaller quantity of flow.

It is understood from the measurement results shown in FIG. 10 that, when the nozzles 22a and 22b are not provided (measurement condition A), the gas 20 with a very low quantity of flow cannot be detected by the flow velocity sensors 15a and 15b for smaller quantity of flow (sensor output value is 0). On the contrary, when the nozzles 22a and 22b are provided (measurement conditions B to D), sensor outputs of over 7 pulses are produced and the flow velocity of the gas 20 with even a very low quantity of flow can be also sensed. From the above, it is understood that by providing the nozzles 22a and 22b, the actual measurement sensitivity of the flow velocity sensors 15 for smaller quantity of flow is increased.

The sensor output value (measurement condition C) of the flow velocity sensor 15a for smaller quantity of flow to which the nozzle 22a having the height of about 10 mm is attached is about twice as large as the sensor output value (measurement condition B) of the flow velocity sensor 15b to which the nozzle 22b having the height of about 7 mm is attached. The above is similar in the case where the flow velocity sensors 15a and 15b for smaller quantity of flow are separately observed (measurement conditions B and D) and the case where the flow velocity sensors 15a and 15b for smaller quantity of flow are simultaneously observed (measurement condition D). Consequently, it is understood from the above that the actual measurement sensitivity in the flow velocity sensors 15a and 15b for smaller quantity of flow can be further improved in the case where the space capacity around the narrower flow path 14A to which the flow velocity sensors 15a and 15b for smaller quantity of flow are provided is largely reduced by increasing the height of the nozzles 22a and 22b.

As described above, according to the flowmeter in the embodiment, not only the regulating strainer 14 is provided but also the nozzles 22a and 22b are provided near the flow velocity sensors 15a and 15b for smaller quantity of flow, respectively, to increase the flow velocity of the gas 20 passing through the narrower flow path 14A and the increased flow velocity of the gas 20 is measured by the flow velocity sensors 15a and 15b for smaller quantity of flow. Consequently, the quantity of flow measurement which is more accurate and has higher sensitivity as compared with the case such as the first embodiment where only the regulating strainer 14 is used can be performed. Since each of the front end part 51 and the rear end part 52 of each of the nozzles 22a and 22b is formed in a streamline shape, the gas 20 is easily led to the nozzles 22a and 22b, the flow velocity of the gas 20 can be easily increased, and the gas 20 led to the nozzles 22a and 22b can be easily exhausted from the rear end part 25, so that it can be prevented that the gas 20 is stagnated in the rear end part 52.

Further, according to the flowmeter of the embodiment, the sensor units 150a and 150b integrally formed by including the flow velocity sensors 15a and 15b for smaller quantity of flow and the nozzles 22a and 22b, respectively, can be detachably inserted to the insertion units 17a and 17b for flow velocity sensors for smaller quantity of flow, so that the attachment and detachment of the flow velocity sensors 15a and 15b for smaller quantity of flow and the nozzles 22a and 22b to/from the pipe 10 can be simplified.

Figure 11:
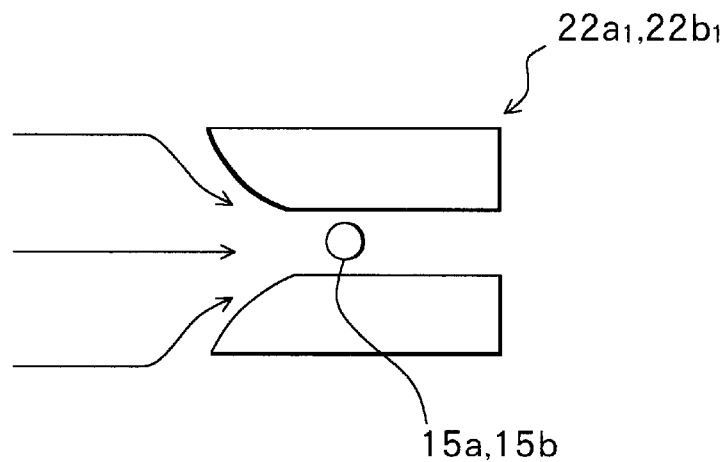
FIG. 11 is a plan view of a modification of the nozzle in the flowmeter shown in FIG. 6.
Figure 12:
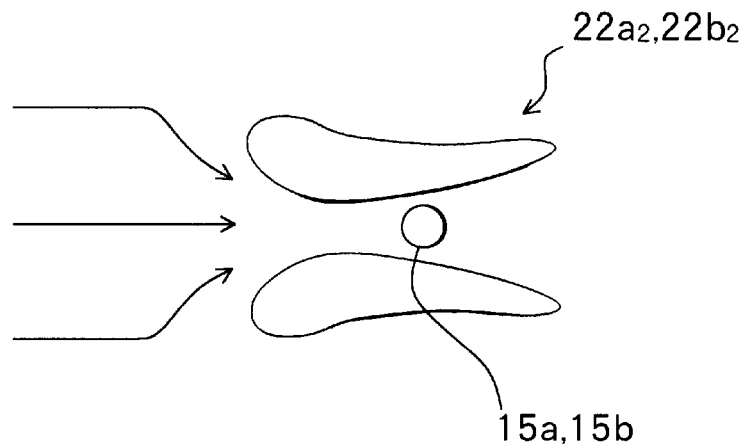
FIG. 12 is a plan view of another modification of the nozzle in the flowmeter shown in FIG. 6.
Figure 13:
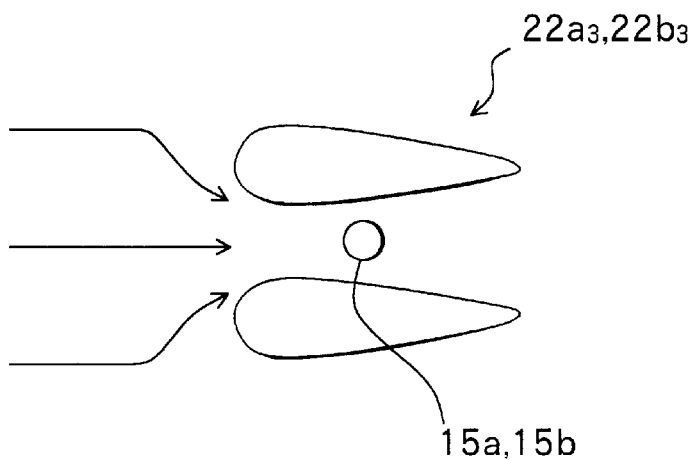
FIG. 13 is a plan view of further another modification of the nozzle in the flowmeter shown in FIG. 6.

The configuration of the nozzles 22a and 22b is not limited to the pair of column-shaped members provided upright as shown in FIGS. 8 and 9 but another shape can be also used. For example, as shown in FIG. 11, knife-shaped nozzles $22a_1$ and $22b_1$ each having a front end part in a streamline shape can be used as the nozzles 22a and 22b. For example, as shown in FIG. 12, nozzles $22a_2$ and $22b_2$ each having the shape of a wing of an airplane, which is a streamline shape as a whole can be also used as the nozzles 22a and 22b. Further, for example, as shown in FIG. 13, nozzles $22a_3$ and $22b_3$ each having a tear drop shape of which area is narrowed from the front end part toward the rear end part can be used as the nozzles 22a and 22b.

Although the nozzles 22a and 22b are provided for the flow velocity sensors 15a and 15b for smaller quantity of flow, respectively, in the foregoing embodiment, in place of the two nozzles, a single nozzle which completely penetrate the regulating strainer 14 can be provided. By this arrangement, unlike the case of the nozzles 22a and 22b, it is unnecessary to separately attach the nozzles 22a and 22b to the regulating strainer 14, so that the attachment can be made easier.

In the foregoing two embodiments, the flow velocity sensors 15a and 15b for smaller quantity of flow are attached to the inner wall face of the pipe 10 and each of the flow velocity sensors 15a and 15b for smaller quantity of flow is arranged to be exposed to the outermost narrower flow path among the narrower flow paths 14A partitioned by the regulating strainer 14. The disposing positions of the flow velocity sensors 15a and 15b for smaller quantity of flow are not limited to the inner wall face of the pipe 10 but can be on the inside of the regulating strainer 14.

Figure 14:
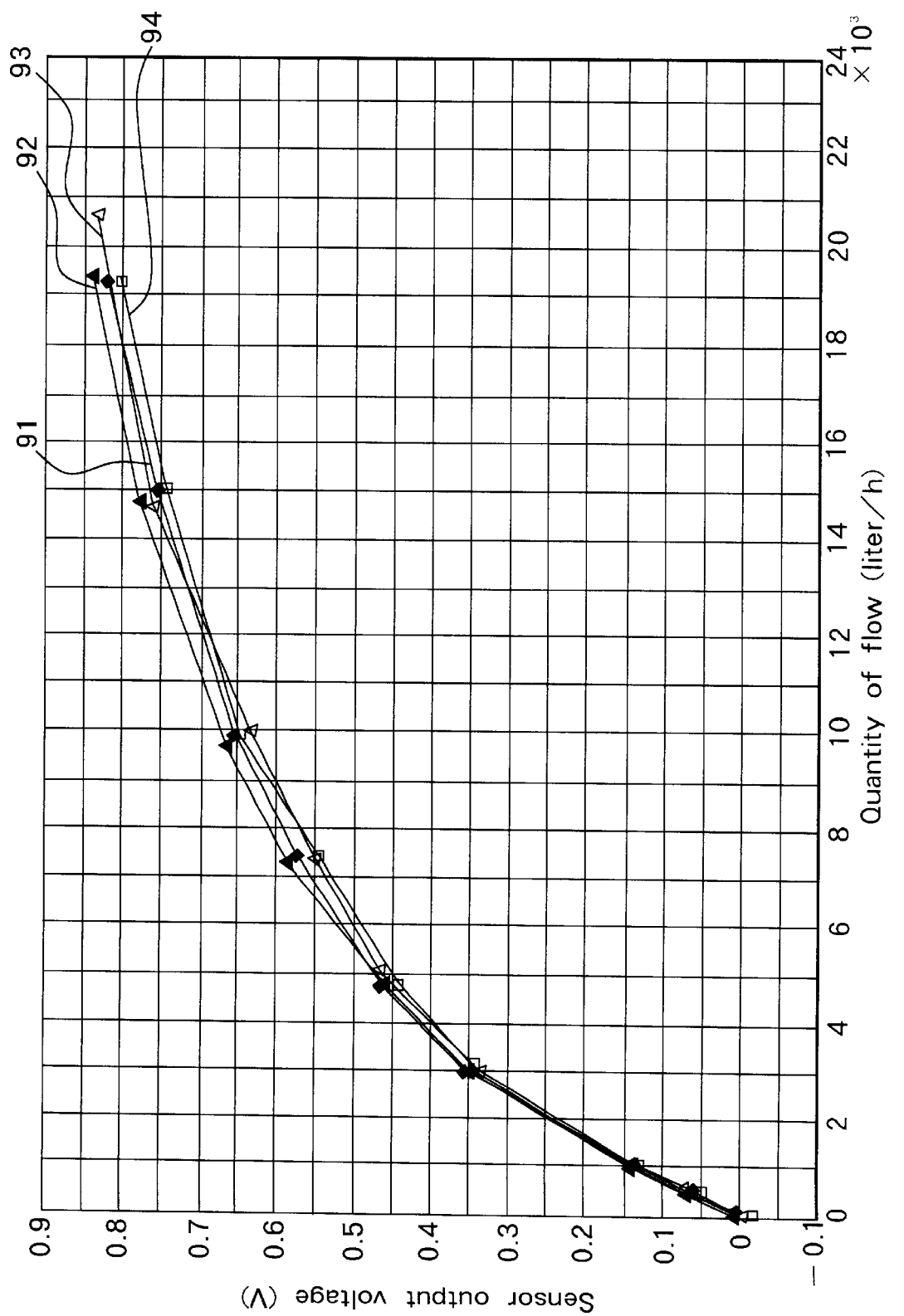
FIG. 14 is an explanatory diagram showing an example of the relation between sensor outputs and installing positions of the flow velocity sensor for smaller quantity of flow in the flowmeter illustrated in FIG. 6.

FIG. 14 is a diagram showing the sensor output characteristics when the positions in which the flow velocity sensors 15a and 15b for smaller quantity of flow in the flowmeter shown in FIG. 1 are mounted are changed. The characteristics diagram shows the relation between the quantity of flow and the sensor output value when the mounting positions of the flow velocity sensors 15a and 15b for smaller quantity of flow are changed toward the inside of the regulating strainer 14 (direction perpendicular to the travel direction of the gas 20). The characteristics diagram show the result of the case where the nozzles 22a and 22b are not provided near the flow velocity sensors 15a and 15b for smaller quantity of flow and air is used as the gas 20 to be measured. The diameter of the flow path 13 in the pipe 10 is about 56 mm. In the diagram, reference numerals 91, 92, 93, and 94 show the sensor output characteristics in the cases where the flow velocity sensors 15a and 15b for smaller quantity of flow are disposed in positions away from the inner wall face of the pipe 10 only by 8 mm, 16 mm, 17 mm, and 24 mm towards the inside of the regulating strainer 14, respectively.

As understood from the characteristics diagram shown in FIG. 14, even when the mounting positions of the flow velocity sensors 15a and 15b for smaller quantity of flow are changed as long as within the regulating strainer 14, the output values are almost the same. Consequently, it is understood that accurate and highly sensitive measurement can be performed without being influenced by a disturbance in the flow of the gas 20 by disposing the flow velocity sensors 15a and 15b for smaller quantity of flow so as to be exposed to not necessarily the outermost narrower flow path 14A but an arbitrary narrower flow path 14A and allowing the sensing part at the front end of each of them to be positioned in the center of the corresponding narrower flow path 14A. As described above, when the flow velocity sensors 15a and 15b for smaller quantity of flow are attached to the outermost narrower flow path 14A, for example, the line connection with the body of a measuring device is easier and the maintenance at the event of a failure in the sensor is easier. From the viewpoint of the above, it is desirable to attach the flow velocity sensors 15a and 15b for smaller quantity of flow to the inner wall face of the pipe 10.

Although two flow velocity sensors 15a and 15b for smaller quantity of flow and two flow velocity sensors 16a and 16b for larger quantity of flow are provided in the embodiment, the numbers are arbitrary. When a plurality of flow velocity sensors for each quantity of flow are provided, even if one of the flow velocity sensors becomes faulty, measurement can be performed by another flow velocity sensor. Consequently, it is desirable to set the number of flow velocity sensors for each quantity of flow to two or larger from the viewpoint of reliability.

As will be described later in a sixth embodiment, the measurement zone 16 for larger quantity of flow may be formed on the upstream side and the measurement zone 15 for smaller quantity of flow may be formed on the downstream side. Further, the cross-sectional shape of the flow path 13 is not limited to a circle but a semicircle, an ellipse, a rectangle, or the like can be also used.

Third Embodiment

A third embodiment of the invention will now be described with reference to FIGS. 15 to 18.

Figure 15:
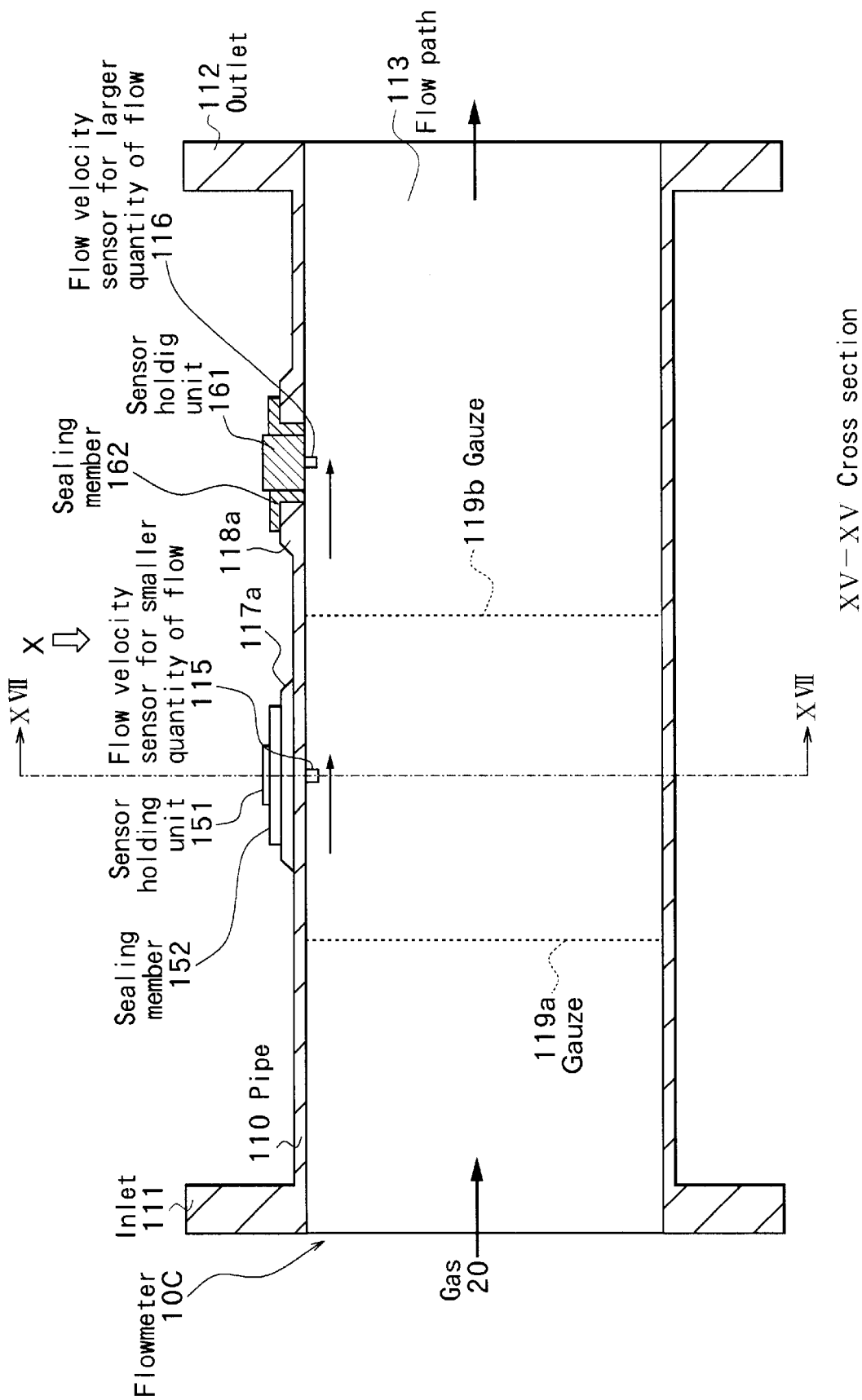
FIG. 15 is a longitudinal cross section of a flowmeter according to a third embodiment of the invention.
Figure 16:
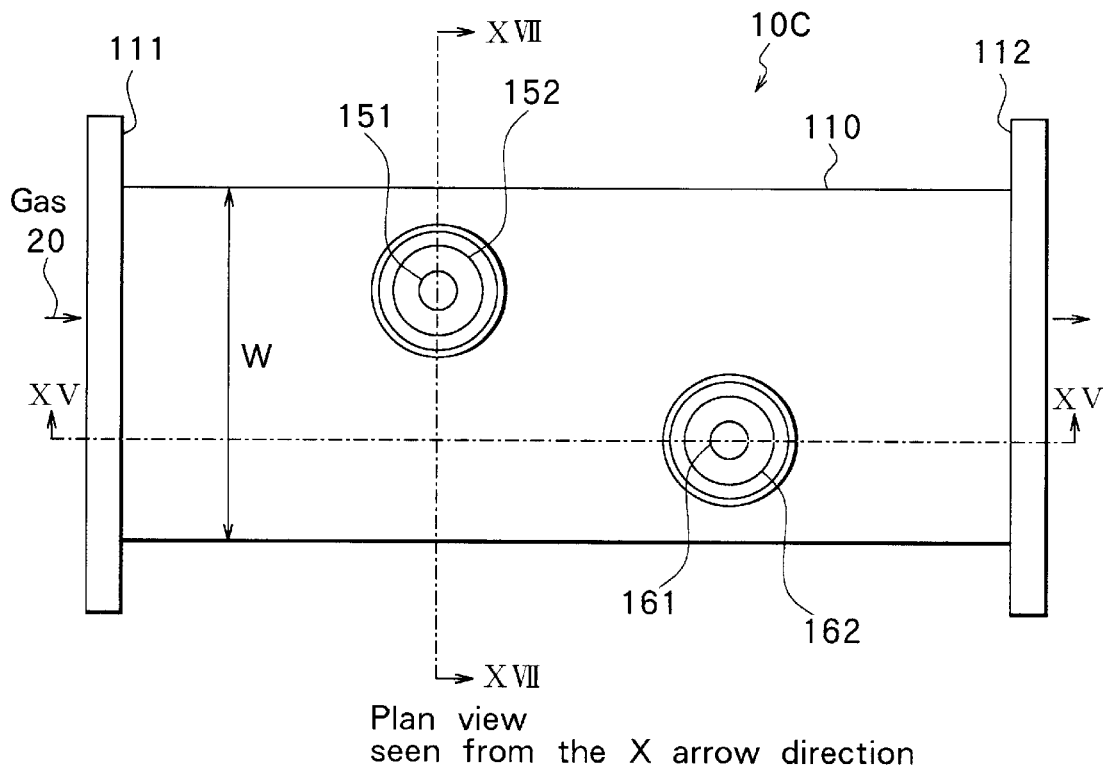
FIG. 16 is a plan view of the flowmeter shown in FIG. 15.
Figure 17:
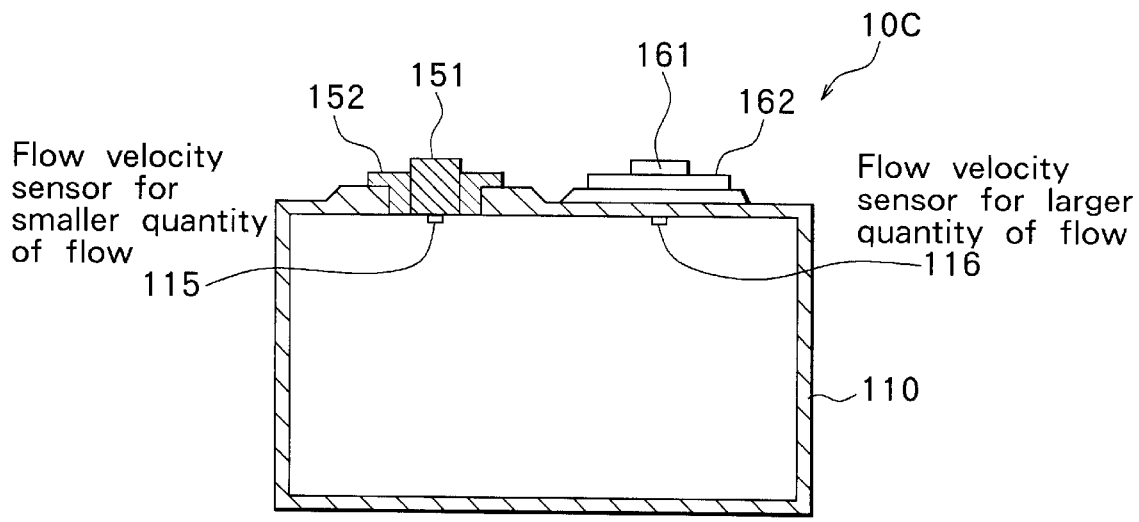
FIG. 17 is a cross section in the direction which perpendicularly crosses the longitudinal direction of the flowmeter shown in FIG. 15.

FIGS. 15 to 17 show the configuration of a flowmeter according to the third embodiment of the invention. FIG. 15 shows a configuration in cross section taken along the flow path direction (longitudinal direction) of the flowmeter. FIG. 16 is an external view seen from the direction of the arrow X in FIG. 15. FIG. 17 shows a configuration in cross section taken along line XVII—XVII of FIG. 16. FIG. 15 corresponds to the cross section taken along line XV—XV of FIG. 16. In the diagrams, the same components as those in the foregoing embodiment are designated by the same reference numerals. A flowmeter 10C comprises an inlet 111 for receiving the gas 20, an outlet 112 for exhausting the gas 20, and a pipe 110 whose cross section is rectangular. The length of the diagonal line of the cross section of the pipe 110 is, for example, about 50 mm.

A flow velocity sensor 115 for smaller quantity of flow and a flow velocity sensor 116 for larger quantity of flow are inserted in insertion units 117a and 118a for flow velocity sensors on one side wall of the pipe 110. The flow velocity sensor 115 for smaller quantity of flow is provided on the upstream side of the flow of the gas 20 and the flow velocity sensor 116 for larger quantity of flow is provided on the downstream side. As shown in FIGS. 16 and 17, the two flow velocity sensors are disposed so as not to be on a straight line along the direction of the flow of the gas 20. To be specific, in FIG. 17, the flow velocity sensor 115 for smaller quantity of flow is disposed on the left side with respect to the center of the flow path cross section and the flow velocity sensor 116 for larger quantity of flow is disposed on the right side with respect to the center of the flow path cross section. Each of the flow velocity sensor 115 for smaller quantity of flow and the flow velocity sensor 116 for larger quantity of flow corresponds to an example of "flow velocity sensor" in the invention.

The flow velocity sensor 115 for smaller quantity of flow is held by a sensor holding unit 151 inserted in the wall of the pipe 110 via a sealing member 152 for holding air tightness of the pipe 110 so as to face a flow path 113. Similarly, the flow velocity sensor 116 for larger quantity of flow is held by a sensor holding unit 161 inserted in the wall of the pipe 110 via a sealing member 162 for holding air tightness of the pipe 110 so as to face the flow path 113. No gap or step exists between the sensor holding unit 151 and the sealing member 152 and between the sealing member 152 and the inner wall of the pipe 110 and the boundaries of them are smooth. Only the flow velocity sensor 115 for smaller quantity of flow is slightly projected from the inner wall face of the pipe 110. Similarly, no gap or step exists between the sensor holding unit 161 and the sealing member 162 and between the sealing member 162 and the inner wall of the pipe 110 and the boundaries of them are smooth. Only the flow velocity sensor 116 for larger quantity of flow is slightly projected from the inner wall face of the pipe 110. Each of the sensor holding units 151 and 161 corresponds to an example of "holding unit" in the invention.

The flow velocity sensor 115 for smaller quantity of flow is used to measure the quantity of flow in a range of the smaller quantity of flow and the flow velocity sensor 116 for larger quantity of flow is used to measure the quantity of flow in a range of the larger quantity of flow.

The flow path 113 on the upstream side of the flow velocity sensor 115 for smaller quantity of flow is provided with a gauze 119a for regulating the flow and the flow path 113 between the flow velocity sensor 115 for smaller quantity of flow and the flow velocity sensor 116 for larger quantity of flow is provided with a gauze 119b for regulating the flow. For example, about #100 mesh is used as each of the gauzes 119a and 119b. The gauze 119a corresponds to an example of "second mesh-type flow regulating member" in the invention and the gauze 119b corresponds to an example of "first mesh-type flow regulating member" in the invention.

The configurations of the flow velocity sensor 115 for smaller quantity of flow and the flow velocity sensor 116 for larger quantity of flow are similar to those of the flow velocity sensor 115a for smaller quantity of flow and the flow velocity sensor 116a for larger quantity of flow in the first and second embodiments or the like.

The flowmeter 10C having such a configuration can be handled as one unit, which is inserted in an arbitrary part of the gas pipe to measure the quantity of flow of the gas 20.

Figure 18:
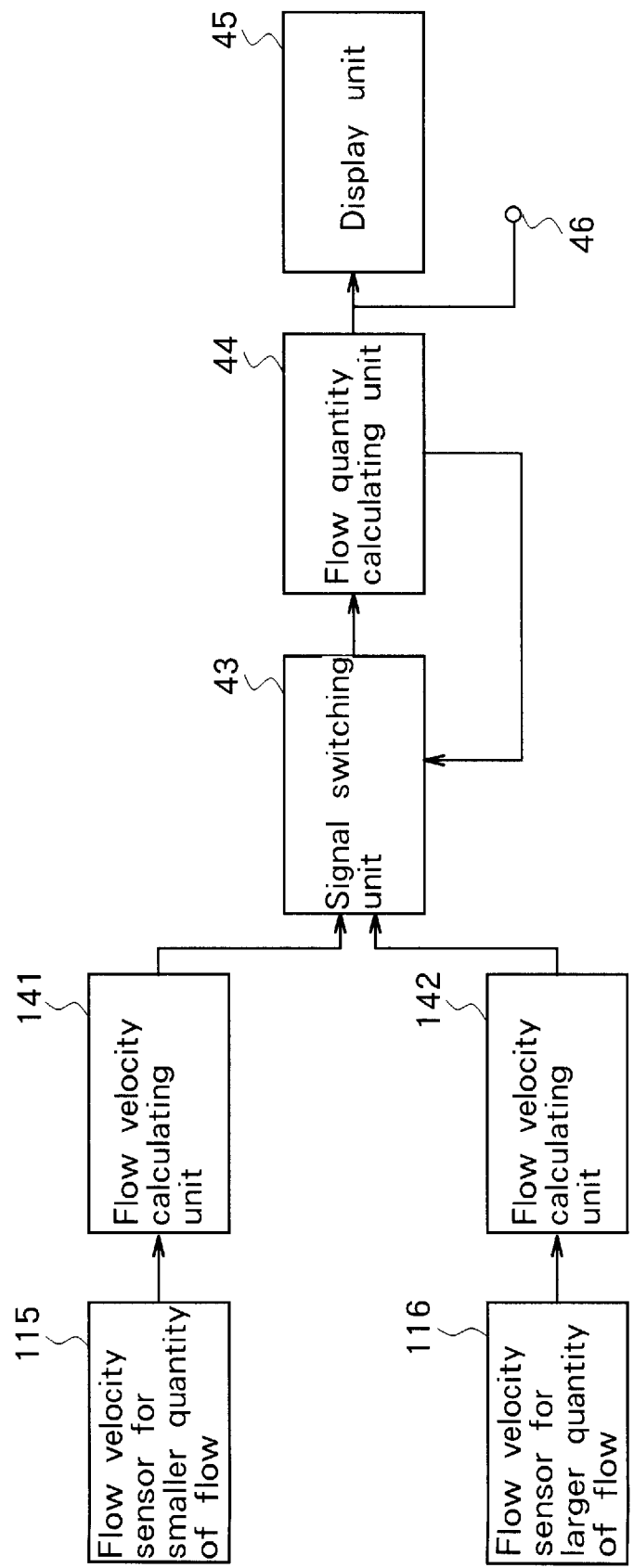
FIG. 18 is a block diagram showing a circuit configuration of the flowmeter of FIG. 15.

FIG. 18 shows a circuit configuration of a gas meter to which the flowmeter 10C according to the embodiment is applied. In the diagram, the same components as those in the circuit (FIG. 3) in the first embodiment are designated by the same reference numerals and their description is omitted here as appropriate. The circuit shown in FIG. 18 comprises a flow velocity calculating unit 141 for calculating the flow velocity of the gas 20 in the range of the smaller quantity of flow on the basis of an output signal of the flow velocity sensor 115 for smaller quantity of flow and a flow velocity calculating unit 142 for calculating the flow velocity of the gas 20 in a range of the larger quantity of flow on the basis of an output signal of the flow velocity sensor 116 for larger quantity of flow. The circuit also comprises the signal switching unit 43 for selecting either an output of the flow velocity calculating unit 141 or an output of the flow velocity calculating unit 142 in accordance with the quantity of flow and outputting the selected output, the quantity of flow calculating unit 44 for calculating the quantity of flow of the gas 20 and an integrated quantity of flow on the basis of the output of the signal switching unit 43, the display unit 45 for displaying the quantity of flow and the integrated quantity of flow calculated by the flow quantity calculating unit 44, and the external output terminal 46 for outputting the quantity of flow and the integrated quantity of flow calculated by the flow quantity calculating unit 44 to the outside. Mainly, each of the flow velocity calculating units 141 and 142 and the flow quantity calculating unit 44 corresponds to an example of "flow quantity calculating means" in the invention.

The other circuit configurations are similar to those of FIG. 3 in the foregoing embodiment and their description is omitted here.

The action of the flowmeter 10C according to the embodiment and that of the gas meter to which the flowmeter 10C is applied will now be described.

The gas 20 supplied from the inlet 111 passes through the gauze 119a and its flow is straightened. A part of the gas 20 passes through the part of the flow velocity sensor 115 for smaller quantity of flow. The flow velocity sensor 115 for smaller quantity of flow outputs a signal according to the flow velocity of the gas 20 passing there. The gas 20 passing through the part of the flow velocity sensor 115 for smaller quantity of flow is exhausted as it is from the outlet 112. At that time, as will be described hereinlater, due to the existence of the flow velocity sensor 115 for smaller quantity of flow, a disturbed flow occurs on the downstream side of the flow velocity sensor 115 for smaller quantity of flow. On the other hand, a part of the gas 20 supplied from the inlet 111, passed through the gauzes 119a and 119b, and subjected to the flow regulating passes through the part of the flow velocity sensor 116 for larger quantity of flow. The flow velocity sensor 116 for larger quantity of flow outputs a signal according to the flow velocity of the gas 20 passing there. The gas 20 passed through the part of the flow velocity sensor 116 for larger flow quantity is exhausted as it is from the outlet 112.

Since the flow of the gas 20 passing through the part of the flow velocity sensor 115 for smaller quantity of flow is straightened by the gauze 119a, the output signal from the flow velocity sensor 115 for smaller quantity of flow is relatively stable.

At this time, the flow velocity sensor 115 for smaller quantity of flow disturbs the flow of the gas 20 passing therethrough. Since the flow velocity sensor 116 for larger quantity of flow on the downstream side is not positioned on the straight line along the direction of the flow of the gas 20 passing through the flow velocity sensor 115 for smaller quantity of flow, the flow disturbed by the flow velocity sensor 115 for smaller quantity of flow does not pass through the part of the flow velocity sensor 116 for larger quantity of flow. That is, the gas 20 passing through the part of the flow velocity sensor 116 for larger quantity of flow flows in a straightened state made by the gauzes 119a and 19b. An output signal from the flow velocity sensor 116 for larger quantity of flow is not therefore influenced by the disturbed flow but is stable.

The flow velocity calculating unit 141 of the gas meter calculates the flow velocity value of the gas 20 on the basis of the output signal of the flow velocity sensor 115 for smaller quantity of flow. The flow velocity calculating unit 142 calculates the flow velocity value of the gas 20 on the basis of the output signal of the flow velocity sensor 116 for larger quantity of flow. When the quantity of flow calculated last time by the flow quantity calculating unit 44 is in the preset range of the smaller quantity of flow, the signal switching unit 43 supplies the flow velocity value outputted from the flow velocity calculating unit 141 to the flow quantity calculating unit 44. When the quantity of flow calculated last time by the flow quantity calculating unit 44 is in the preset range of the larger quantity of flow, the signal switching unit 43 supplies the flow velocity value outputted from the flow velocity calculating unit 142 to the flow quantity calculating unit 44. The flow quantity calculating unit 44 calculates the quantity of flow and the integrated quantity of flow on the basis of the flow velocity value supplied from the signal switching unit 43. That is, when the quantity of flow is in the preset range of the smaller quantity of flow, the quantity of flow and the integrated quantity of flow are calculated on the basis of the flow velocity value from the flow velocity calculating unit 141. When the quantity of flow is in the preset range of the larger quantity of flow, the quantity of flow and the integrated quantity of flow are calculated on the basis of the flow velocity value from the flow velocity calculating unit 142. The quantity of flow and the integrated quantity of flow calculated by the flow quantity calculating unit 44 are displayed on the display unit 45.

As described above, according to the embodiment, the flow velocity sensor 115 for smaller quantity of flow and the flow velocity sensor 116 for larger quantity of flow are disposed so as not to be on a straight line along the direction of the flow of the gas 20, so that the influence of the flow disturbed by the flow velocity sensor 115 for smaller quantity of flow can be effectively prevented from exerting on the flow velocity sensor 116 for larger quantity of flow. Thus, the flow velocity detecting accuracy of the flow velocity sensor 116 for larger quantity of flow is improved.

In the embodiment, the gauze 119b is disposed in the flow path 113 between the flow velocity sensor 115 for smaller quantity of flow and the flow velocity sensor 116 for larger quantity of flow. Consequently, the flow of the gas 20 passed through the flow velocity sensor 115 for smaller quantity of flow is straightened and the state of the flow near the flow velocity sensor 116 for larger quantity of flow is more stabilized, so that the stability of the output signal of the flow velocity sensor 116 for larger quantity of flow can be further increased.

Further, according to the embodiment, since the gauze 119a is disposed also in the flow path 113 on the upstream side of the flow velocity sensor 115 for smaller quantity of flow disposed on the upstream side, the state of the flow near the flow velocity sensor 115 for smaller quantity of flow is good and the stability of the output signal of the flow velocity sensor 115 for smaller quantity of flow can be also increased.

According to the embodiment, by disposing the flow velocity sensor 115 for smaller quantity of flow and the flow velocity sensor 116 for larger quantity of flow so as not to be on the same straight line along the flow direction, the flow velocity sensor 116 for larger quantity of flow is not influenced by the disturbed flow caused due to the existence of the flow velocity sensor 115 for smaller quantity of flow. Besides, only by disposing the gauze 119b between the two flow velocity sensors without considering the positional relation between the flow velocity sensor 115 for smaller quantity of flow and the flow velocity sensor 116 for larger quantity of flow, the influence of the disturbed flow can be also eliminated. Specifically, even when the flow velocity sensor 115 for smaller quantity of flow and the flow velocity sensor 116 for larger quantity of flow are disposed on the same straight line along the flow direction, by disposing a proper mesh-shaped gauze 119b in the flow path 113 between the flow velocity sensor 115 for smaller quantity of flow and the flow velocity sensor 116 for larger quantity of flow, the flow of the gas 20 passed through the part of the flow velocity sensor 115 for smaller quantity of flow can be straightened. Consequently, the flow of the gas 20 passing through the part of the flow velocity sensor 116 for larger quantity of flow on the downstream side can be stabilized so that the stability of the output signal of the flow velocity sensor 116 for larger quantity of flow can be enhanced. In this case, the flow velocity sensor 115 for smaller quantity of flow and the flow velocity sensor 116 for larger quantity of flow can be disposed on the same straight line, so that the width of the flow path, moreover, the width of the sensor installing face of the pipe 110 can be reduced.

Two or more each of the gauzes 119a and 119b may be also provided. Since a pressure loss is relatively easily brought about by the gauze, it is preferable to determine the mesh roughness, shape, the mounting number, and the like of the gauze in consideration of the pressure loss.

Fourth Embodiment

With reference to FIGS. 19 to 24, a fourth embodiment of the invention will now be described.

Figure 19:
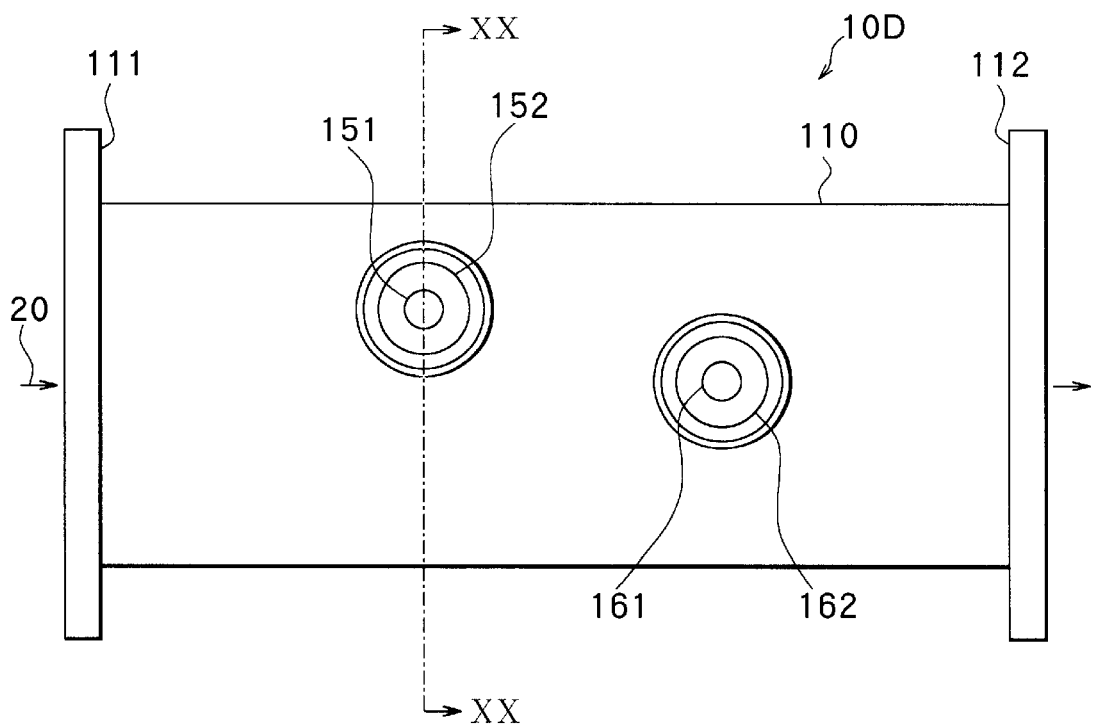
FIG. 19 is a plan view of the flowmeter according to a fourth embodiment of the invention.
Figure 20:
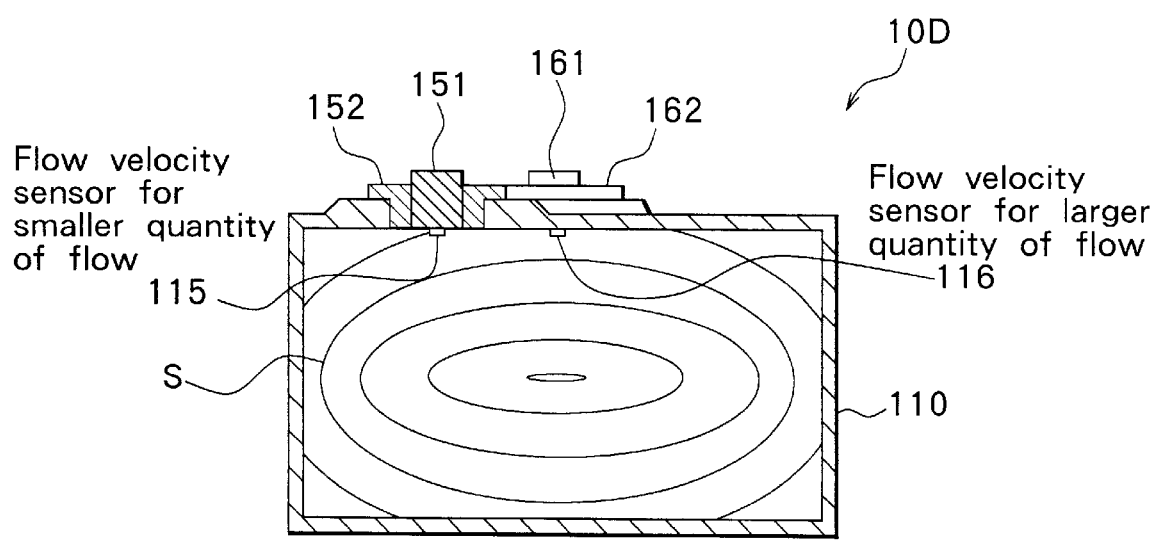
FIG. 20 is a cross section in the direction which perpendicularly crosses the longitudinal direction of the flowmeter shown in FIG. 19.

FIGS. 19 and 20 show the configuration of a flowmeter according to the fourth embodiment of the invention. FIGS. 19 and 20 correspond to FIGS. 16 and 17 in the third embodiment, respectively. FIG. 20 shows a configuration in cross section taken along line XX—XX of FIG. 19. In FIGS. 19 and 20, the same components as those in FIGS. 16 and 17 are designated by the same reference numerals and their description is omitted here. In this embodiment, a longitudinal cross section corresponding to FIG. 15 in the third embodiment is omitted.

As shown in FIG. 19, a flowmeter 10D of the fourth embodiment is similar to the flowmeter (FIGS. 16 and 17) of the third embodiment with respect to the point that the flow velocity sensor 115 for smaller quantity of flow and the flow velocity sensor 116 for larger quantity of flow are disposed so as not to be on a straight line along the direction of the flow of the gas 20, but is different from the flowmeter of the third embodiment with respect to the point that the flow velocity sensor 116 for larger quantity of flow on the downstream side of the two flow velocity sensors is disposed on the pipe wall in the center part in the flow path width direction of the pipe 110. The other configurations are similar to those of the third embodiment.

As shown in FIG. 20, the cross section in the direction which perpendicularly crosses the gas flow direction in the flow path 113 in the pipe 110 has a flow velocity distribution such that the flow is fast in the center of the cross section and becomes slower as the position is apart from the center (that is, toward the pipe wall). In the diagram, a curve shown by reference character S denotes an equal velocity line connecting the points at which the flow velocity is equal. In the flow velocity distribution near the pipe wall in the cross section of the flow path 113, the flow velocity in the center in the width direction of the flow path in each pipe wall face is the highest and becomes lower toward the pipe wall.

In the embodiment, one of the two flow velocity sensors (flow velocity sensor 116 for larger quantity of flow on the downstream side in the example of FIGS. 19 and 20) is disposed on the pipe wall in the center part in the flow path width direction so as to obtain the maximum detection sensitivity of the flow velocity. In this case, moreover, in a manner similar to the third embodiment, the flow velocity sensor 116 for larger quantity of flow is not influenced by the flow disturbed by the flow velocity sensor 115 for smaller quantity of flow on the upstream side, so that its output signal is stable.

As described above, according to the embodiment, the flow velocity sensor 115 for smaller quantity of flow and the flow velocity sensor 116 for larger quantity of flow are disposed so as not to be on a straight line along the direction of the flow of the gas 20 and the flow velocity sensor 116 for larger quantity of flow on the downstream side of the two flow velocity sensors is disposed on the pipe wall in the center part in the flow path width direction of the pipe 110. Thus, the quantity of flow can be measured stably over a wide range of the quantity of flow and the measurement especially over the range of the larger quantity of flow can be performed at high sensitivity.

Figure 21:
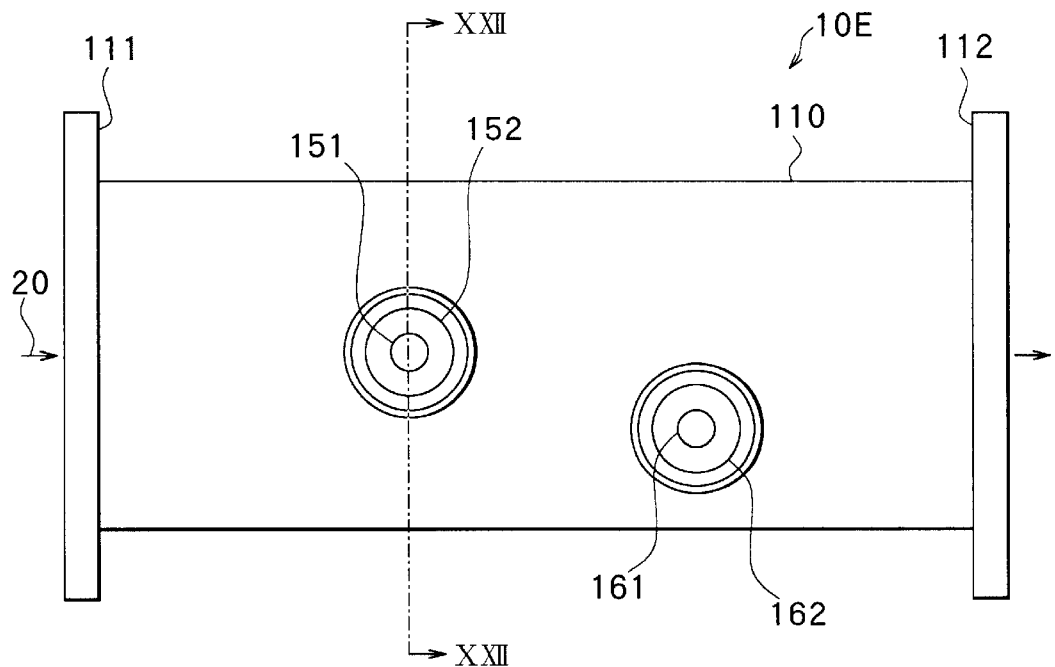
FIG. 21 is a plan view of a flowmeter as a modification of the fourth embodiment of the invention.
Figure 22:
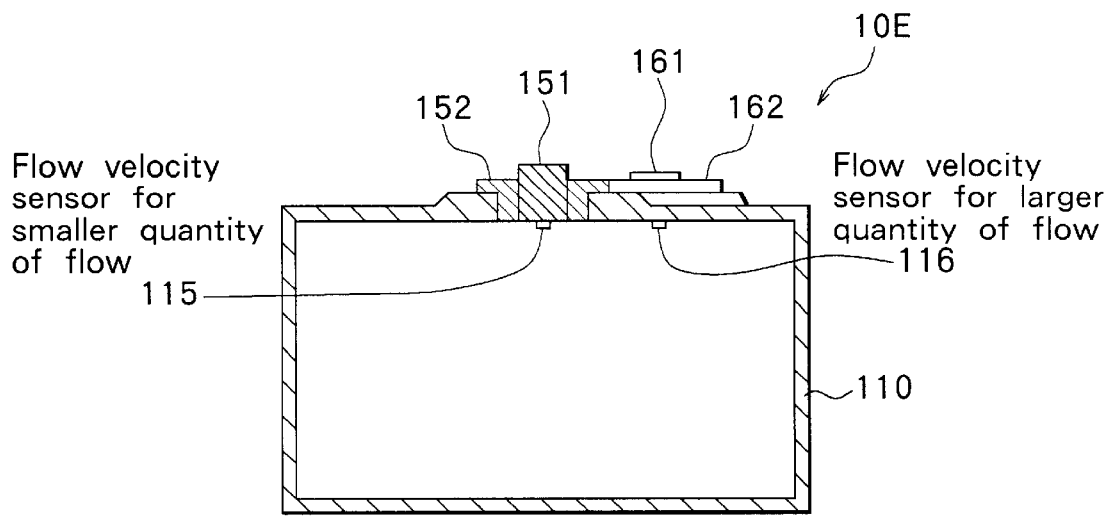
FIG. 22 is a cross section in the direction which perpendicularly crosses the longitudinal direction of the flowmeter shown in FIG. 21.

In contrast with the positional relation shown in FIGS. 19 and 20, for example, as shown in FIGS. 21 and 22, a flowmeter 10E may be constructed by disposing the flow velocity sensor 115 for smaller quantity of flow on the upstream side of the two flow velocity sensors on the pipe wall in the center part in the flow path width direction of the pipe 110. In this case, while raising the flow velocity detecting sensitivity in the range of the smaller quantity of flow, the flow velocity sensor 116 for larger quantity of flow is not influenced by the flow disturbed by the flow velocity sensor 115 for smaller quantity of flow on the upstream side. FIGS. 21 and 22 correspond to FIGS. 16 and 17. FIG. 22 shows the configuration in cross section taken along line XXII—XXII of FIG. 21. In FIGS. 21 and 22, the same components as those in FIGS. 16 and 17 are designated by the same reference numerals and their description is omitted here.

Figure 23:
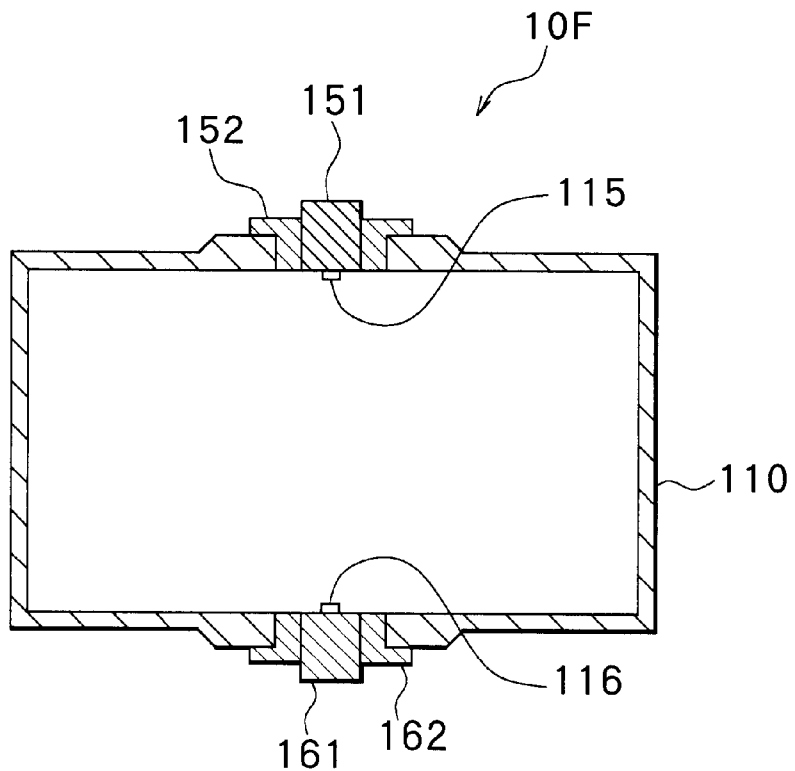
FIG. 23 is a cross section in the direction which perpendicularly crosses the longitudinal direction of a flowmeter as another modification of the fourth embodiment of the invention.

For example, as shown in FIG. 23, a flowmeter 10F may be also constructed in such a manner that the flow velocity sensor 115 for smaller quantity of flow and the flow velocity sensor 116 for larger quantity of flow are disposed on two pipe walls facing each other over the flow path 113 in the pipe 110. In this case, each of the flow velocity sensors can be disposed in the center part in the flow path width direction in each pipe wall. In this case of such a disposing relation as well, the flow velocity sensor 115 for smaller quantity of flow and the flow velocity sensor 116 for larger quantity of flow are not on a straight line along the direction of the flow of the gas 20, so that the flow disturbed by one of the flow velocity sensors does not exert an influence on the other flow velocity sensor. In the case of such facing arrangement, one of the two flow velocity sensors may be disposed on the upstream side and the other flow velocity sensor may be disposed on the downstream side, or both of the flow velocity sensors may be disposed on the same cross section which perpendicularly crosses the longitudinal direction (direction along the flow direction of the gas 20) of the flow path 113.

Figure 24:
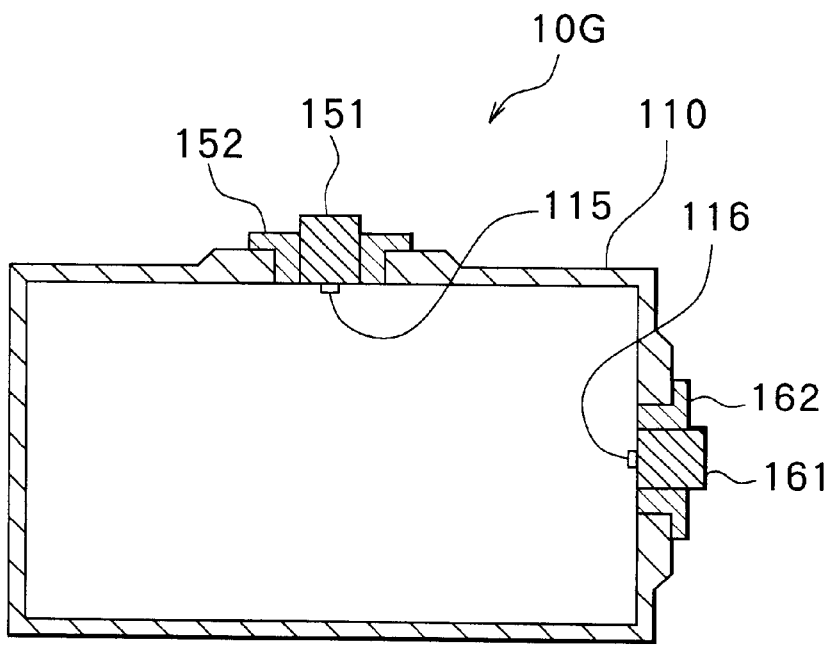
FIG. 24 is a cross section in the direction which perpendicularly crosses the longitudinal direction of a flowmeter as further another modification of the fourth embodiment of the invention.

Further, as shown in FIG. 24, a flowmeter 10G may be also constructed by disposing the flow velocity sensor 115 for smaller quantity of flow and the flow velocity sensor 116 for larger quantity of flow on two pipe walls which perpendicularly cross each other in the pipe 110. In this case as well, it is possible to dispose the flow velocity sensors in the center part in the flow path width direction in each pipe wall. In the case of such an arrangement relation as well, the flow velocity sensor 115 for smaller quantity of flow and the flow velocity sensor 116 for larger quantity of flow are not on one straight line along the direction of the flow of the gas 20, so that the flow disturbed by one of the flow velocity sensors does not exert an influence on the other flow velocity sensor. In the case of such perpendicularly crossing arrangement as well, in a manner similar to the case of FIG. 23, one of the two flow velocity sensors may be disposed on the upstream side and the other flow velocity sensor may be disposed on the downstream side, or both of the flow velocity sensors may be disposed on the same cross section which perpendicularly crosses the longitudinal direction (direction along the flow direction of the gas 20) of the flow path 113.

In each of the cases shown in FIGS. 23 and 24 as well, it is preferable to provide the gauzes 119a and 119b in proper positions in the flow path 113.

Fifth Embodiment

Figure 25:
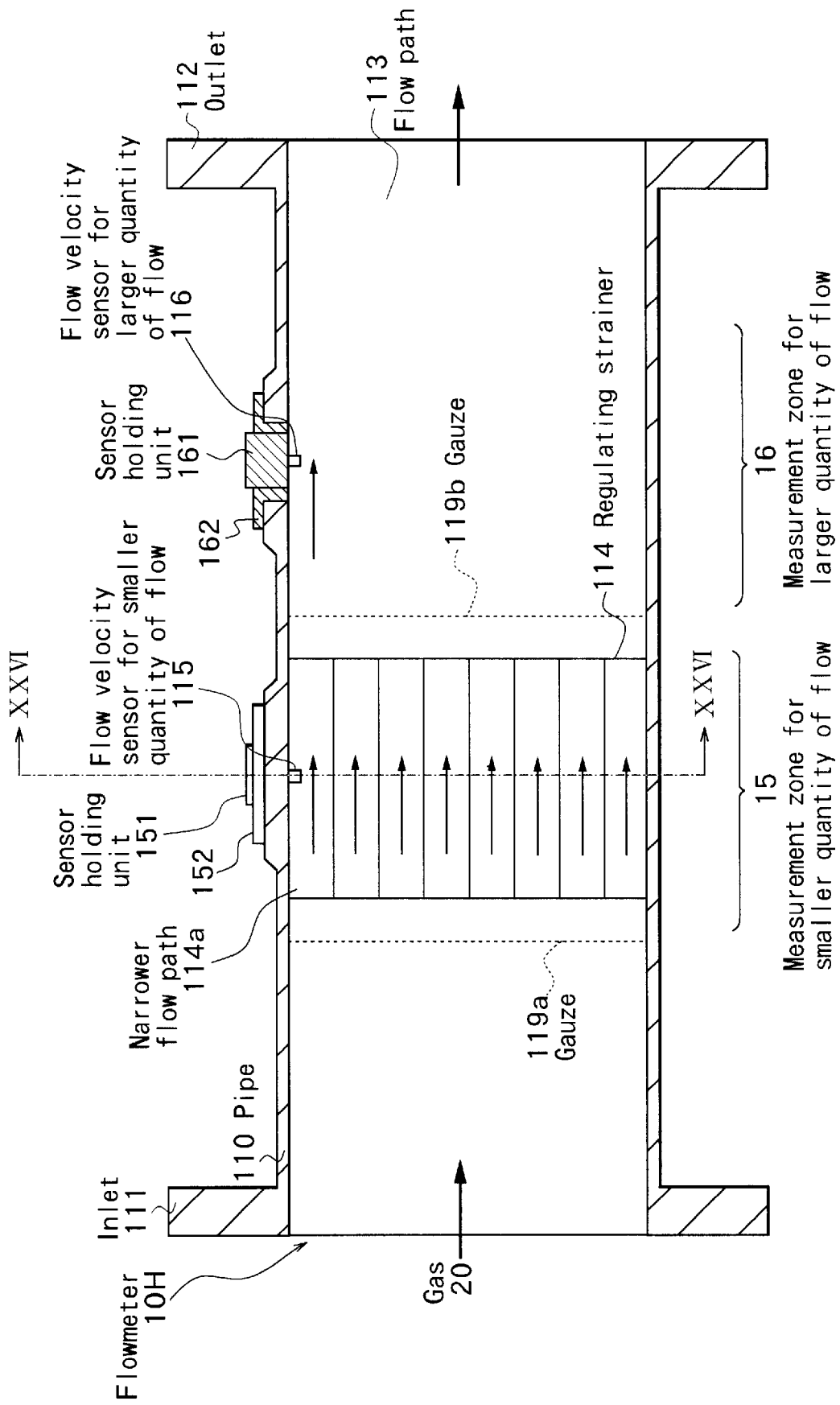
FIG. 25 is a longitudinal cross section of a flowmeter according to a fifth embodiment of the invention.
Figure 26:
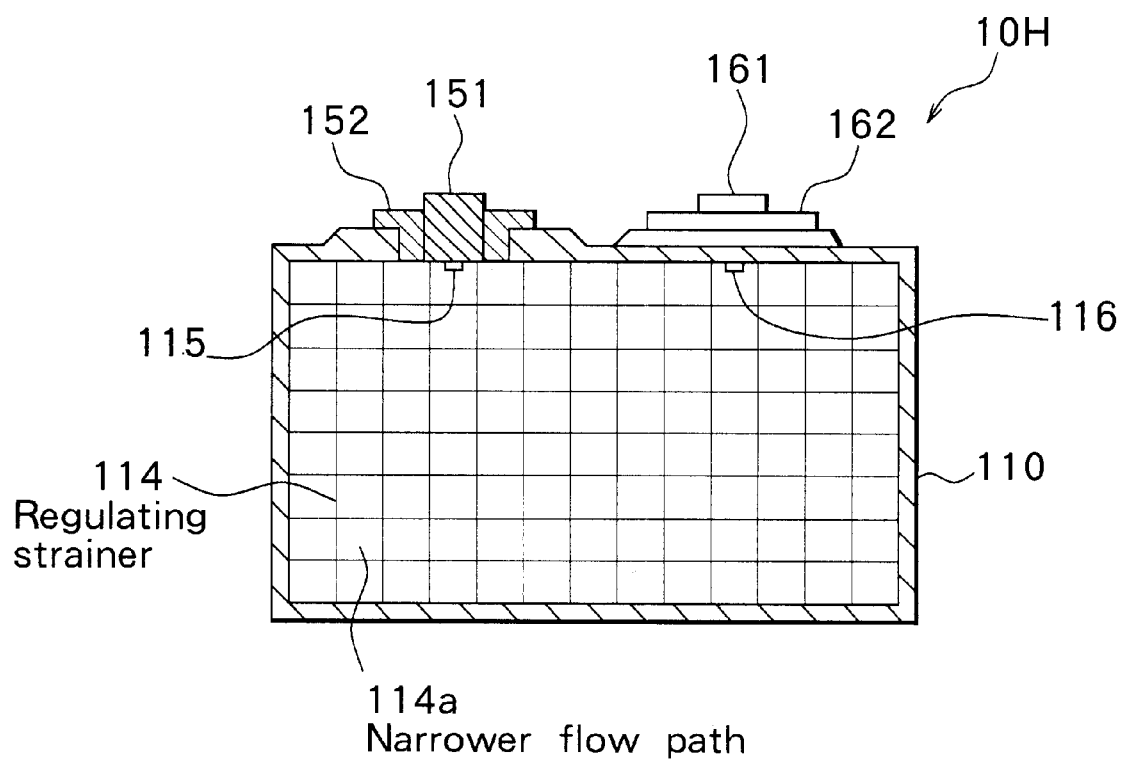
FIG. 26 is a cross section in the direction which perpendicularly crosses the longitudinal direction of the flowmeter shown in FIG. 25.

With reference to FIGS. 25 and 26, a fifth embodiment of the invention will be described.

FIG. 25 shows the configuration in cross section in the flow path direction (longitudinal direction) of a flowmeter according to a fifth embodiment of the invention. FIG. 26 shows the configuration in cross section taken along line XXVI—XXVI of FIG. 25. In the diagrams, the same components as those in the first embodiment (FIG. 1 and the like) are designated by the same reference numerals and their description is omitted here as appropriate.

As shown in FIGS. 25 and 26, in a flowmeter 10H of the embodiment, a regulating strainer 114 having the action of regulating the flow of the gas 20 and, especially, increasing the flow velocity near the pipe wall is provided in a flow path range including the position in which the flow velocity sensor 115 for smaller quantity of flow is disposed (that is, the measurement zone for smaller quantity of flow).

As shown in FIG. 25, the regulating strainer 114 divides the flow path 113 into a plurality of narrower flow paths 114a each having a smaller cross-sectional area along the longitudinal direction by a number of partitions. The gas 20 flows through the divided narrower flow paths 114a. The shape of the cross section of the narrower flow path 114a may be not only the rectangle as shown in FIG. 26 but also another shape such as a triangle, a wave shape, or a hexagonal shape. The flow velocity sensor 115 for smaller quantity of flow is disposed in one of the narrower flow paths 114a along the pipe wall. The regulating strainer 114 corresponds to an example of "flow path dividing member" in the invention.

The other configurations are similar to those of the third embodiment (FIGS. 15 and 17). Since the external view from the side face direction of the flowmeter 10H of the embodiment is not different from that of FIG. 16, it is omitted here. In FIGS. 25 and 26, the same components as those in FIGS. 15 and 17 of the third embodiment are designated by the same reference numerals and their description is omitted here as appropriate.

The flowmeter 10H of the embodiment has the action similar to that described with reference to FIGS. 4 and 5 in the first embodiment. To be specific, since the plurality of narrower flow paths 114a are formed by the regulating strainer 114, the quantity of flow of the gas passing through the part of the flow velocity sensor 115 for smaller quantity of flow is higher than that in the case where no regulating strainer 114 is provided and the measurement sensitivity of the flow velocity sensor 115 for smaller quantity of flow increases. Due to the existence of the regulating strainer 114, a disturbed flow near the flow velocity sensor 115 for smaller quantity of flow is suppressed. Consequently, as compared with the third and fourth embodiments, the flow quantity measurement with higher sensitivity and higher accuracy can be performed.

The other action is similar to that of the third and fourth embodiments.

Although the gauzes 119a and 119b are provided in the embodiment, they do not have to be provided.

Sixth Embodiment

Figure 27:
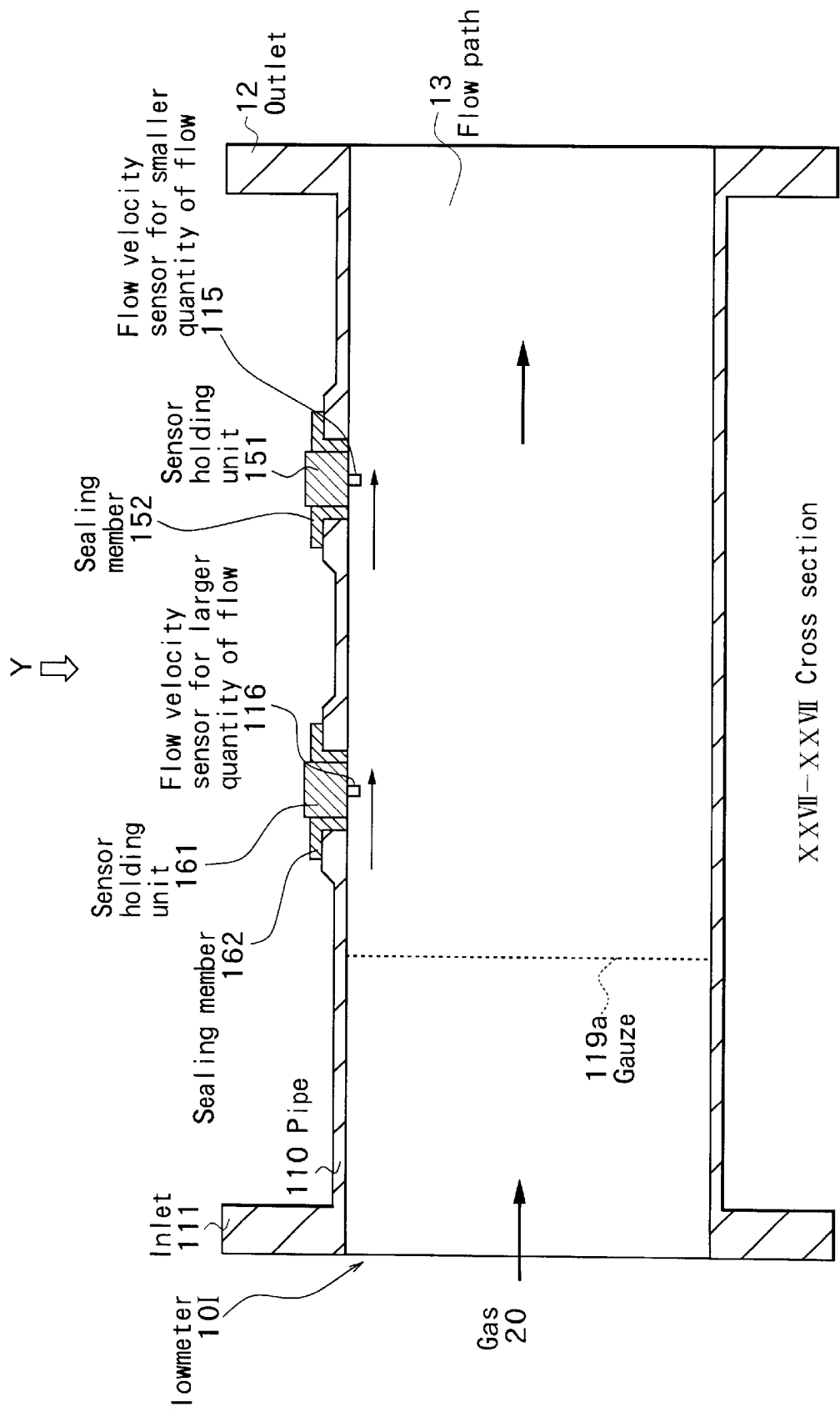
FIG. 27 is a longitudinal cross section of a flowmeter according to a sixth embodiment of the invention.
Figure 28:
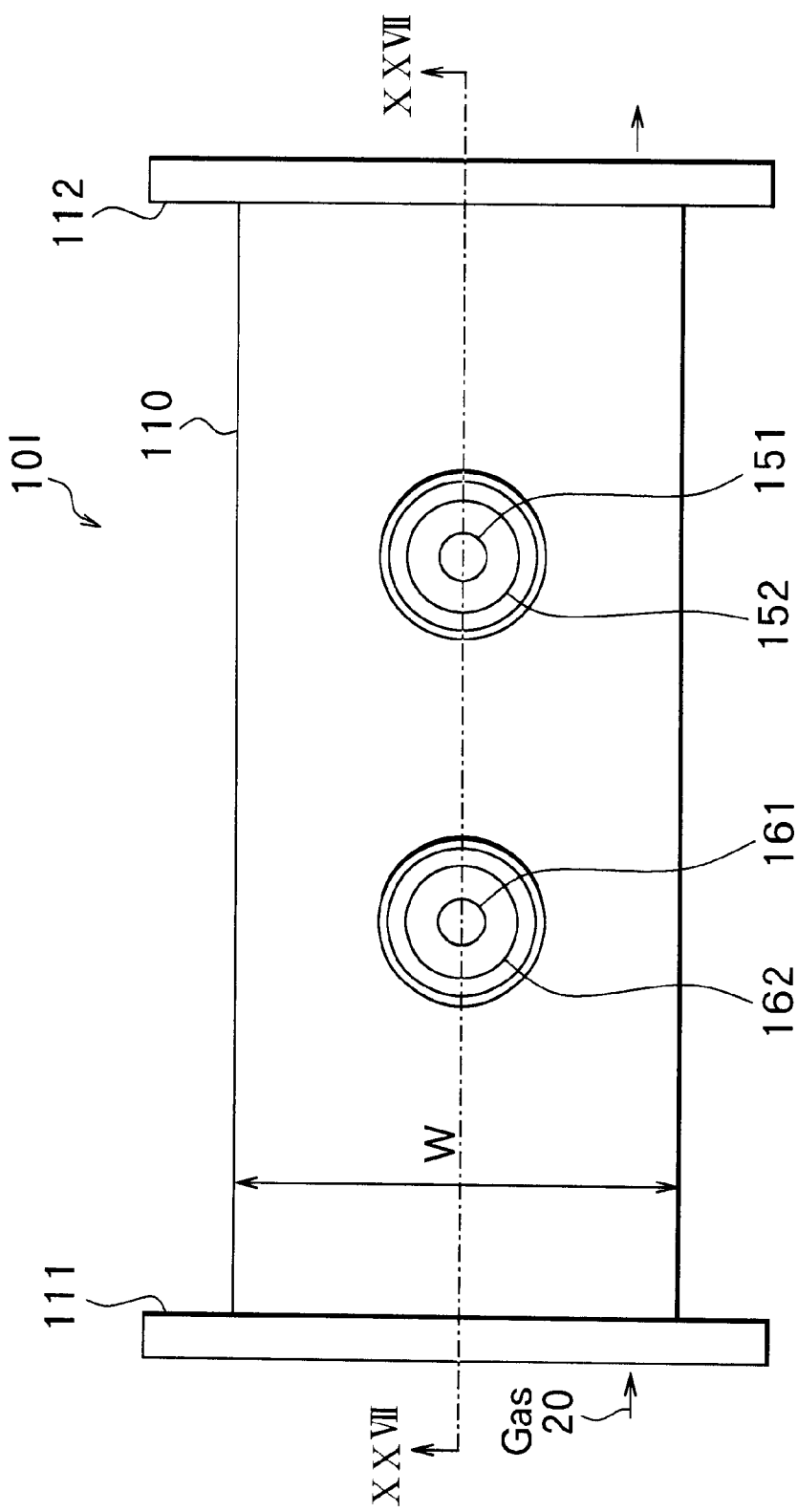
FIG. 28 is a plan view of the flowmeter shown in FIG. 27.

With reference to FIGS. 27 and 28, a sixth embodiment of the invention will be described.

FIGS. 27 and 28 show the configuration of the flowmeter according to the sixth embodiment of the invention. FIG. 27 shows the configuration in cross section in the flow path direction (longitudinal direction) of a flowmeter 101 according to the embodiment. FIG. 28 is an external view seen from the direction of the arrow Y in FIG. 27. In the diagrams, the same components as those in the flowmeter of the third embodiment are designated by the same reference numerals and their description is omitted here as appropriate. In the embodiment, the cross section corresponding to FIG. 17 in the third embodiment is omitted.

As shown in FIGS. 27 and 28, according to the flowmeter 101 of the embodiment, in contrast with the third to fifth embodiments, the flow velocity sensor 116 for larger quantity of flow is disposed on the upstream side, the flow velocity sensor 115 for smaller quantity of flow is disposed on the downstream side, and both of them are disposed on a straight line along the flow direction of the gas 20. In the embodiment, the gauze 119b is not disposed between the flow velocity sensor 116 for larger quantity of flow and the flow velocity sensor 115 for smaller quantity of flow but the gauze 119a is disposed only on the upstream side of the flow velocity sensor 116 for larger quantity of flow. The other configurations are similar to those of the third embodiment (FIGS. 15 and 16).

Since the flow velocity sensor 116 for larger quantity of flow is disposed on the upstream side in the embodiment, when the quantity of flow is measured in the range of the larger quantity of flow by using the flow velocity sensor 116 for larger quantity of flow, there is no possibility that the flow disturbed by the flow velocity sensor 115 for smaller quantity of flow on the downstream side exerts an influence on the output signal of the flow velocity sensor 116 for larger quantity of flow on the upstream side. On the other hand, when the quantity of flow is measured in the range of the smaller quantity of flow by using the flow velocity sensor 115 for smaller quantity of flow, the flow disturbed by the flow velocity sensor 116 for larger quantity of flow on the upstream side hardly exerts an influence on the output signal of the flow velocity sensor 115 for smaller quantity of flow on the downstream side. Since the flow velocity is low in the range of the smaller quantity of flow, when some distance is assured between the two flow velocity sensors, the flow disturbed by the flow velocity sensor 116 for larger quantity of flow on the upstream side hardly reaches the flow velocity sensor 115 for smaller quantity of flow on the downstream side.

According to the flowmeter of the embodiment, the flow velocity sensor 116 for larger quantity of flow is disposed on the upstream side and the flow velocity sensor 115 for smaller quantity of flow is disposed on the downstream side. Consequently, even when the flow regulating member such as a gauze is not disposed between two sensors, the flow velocity sensor 115 for smaller quantity of flow on the downstream side is not influenced by the flow disturbed by the flow velocity sensor 116 for larger quantity of flow in the range of the larger quantity of flow on the upstream side. The stable flow quantity measurement can be performed over a wide range of the quantity of flow. Moreover, according to the embodiment, since the flow velocity sensor 116 for larger quantity of flow on the upstream side and the flow velocity sensor 115 for smaller quantity of flow on the downstream side can be disposed on a straight line along the flow of the gas 20 without providing a gauze, as compared with the flowmeter of the third embodiment (FIGS. 15 and 16) and the flowmeter shown in FIGS. 19 to 22 in the fourth embodiment, useless space on the face on which the two flow velocity sensors are disposed is smaller. As a result, the width W (FIG. 28) of the pipe 110 can be also reduced.

Although the flow velocity sensor 116 for larger quantity of flow on the upstream side and the flow velocity sensor 115 for smaller quantity of flow on the downstream side are disposed on a straight line along the flow of the gas 20 in the embodiment, the invention is not limited to the arrangement. The flow velocity sensor 116 for larger quantity of flow on the upstream side and the flow velocity sensor 115 for smaller quantity of flow on the downstream side may be disposed so as not to be on a straight line along the flow of the gas 20. The positional relation between them in this case corresponding to, for example, the third and fourth embodiments (FIGS. 16, 17 and 19 to 24) can be used.

As shown in FIG. 27, although the gauze 119a is disposed only in the flow path on the upstream side of the flow velocity sensor 116 for larger quantity of flow on the upstream side and no gauze is provided between the two flow velocity sensors in the embodiment, in a manner similar to the case of FIG. 15, the gauze 119b may be also disposed in the flow path between the flow velocity sensor 116 for larger quantity of flow on the upstream side and the flow velocity sensor 115 for smaller quantity of flow on the downstream side.

The invention has been described above by the embodiments. The invention is not limited to the embodiments but can be variously modified. For example, in the third to sixth embodiments, the range of the quantity of flow is divided into two ranges of the larger and smaller quantity of flow and the flow velocity sensor 115 for smaller quantity of flow and the flow velocity sensor 116 for larger quantity of flow are disposed in the corresponding ranges. The range of the quantity of flow may be divided into three or more ranges such as range of the smaller quantity of flow, range of intermediate quantity of flow, and range of the larger quantity of flow, and the flow velocity sensor for smaller quantity of flow, flow velocity sensor for intermediate quantity of flow, and flow velocity sensor for larger quantity of flow may be provided, respectively. In this case as well, by properly setting the positions of the flow velocity sensors and disposing the gauze, the flow velocity sensors can be prevented from being influenced by the flow disturbed by the other flow velocity sensors, so that the very stable flow quantity measurement can be performed over a wider quantity of flow range. Obviously, it is also possible to divide the range of the quantity of flow into four or more ranges and provide flow velocity sensors in the corresponding measurement ranges.

Although the case where the shape in cross section of the flow path 113 is circular or rectangular has been described in the foregoing embodiments, the invention is not limited to the shapes. For example, the shape may be a semicircle, an ellipse, a triangle, or other polygon having five or more sides.

The flow velocity sensor is not limited to a thermal flow velocity sensor of a type having a heat generating unit and two temperature sensors as mentioned above. For example, a thermal flow velocity sensor of a type which has one heat generating unit and obtains the flow velocity from a power supplied to the heat generating unit necessary to maintain the temperature (resistance) of the heat generating unit constant or obtains the flow velocity from the temperature (resistance) of the heat generating unit by heating the heat generating unit with a constant current or power may be also used. Further, the flow velocity sensor is not limited to the thermal flow velocity sensor. For example, an ultrasonic sensor using ultrasonic waves or the like can be also used. The invention can be also applied to a flowmeter for measuring the quantity of flow of not only a vapor except for gas but also a liquid.

As described above, according to the flowmeter of the invention, the flow path dividing member for dividing the flow path into a plurality of narrower flow paths each having a smaller cross-sectional area is provided in the measurement zone for smaller quantity of flow in the flow path of the pipe, the first flow velocity sensor for outputting a signal according to the flow velocity of the fluid passing through the measurement zone for larger quantity of flow is provided in the measurement zone for larger quantity of flow in the flow path of the pipe and, further, the second flow velocity sensor for outputting a signal according to the flow velocity of the fluid passing through the narrower flow path is provided in the narrower flow path formed by the flow path dividing member. In accordance with the quantity of flow, the quantity of flow is calculated on the basis of at least one of the output signal of the first flow velocity sensor and the output signal of the second flow velocity sensor. Consequently, also in the range of the smaller quantity of flow, the influence of the drift of the fluid is hardly exerted, so that the quantity of flow can be measured with high accuracy. Specifically, also in the range of the smaller quantity of flow where the drift substantially easily occurs, the mounting place of the second flow velocity sensor is not limited but the second flow velocity sensor can be mounted in an arbitrary position. For example, even when the second flow velocity sensor is mounted near the flow path wall to which the attachment is easy, a very low quantity of flow can be detected. According to the flowmeter of the invention as described above, the limitation on the range of the quantity of flow to which the second flow velocity sensor can be applied is substantially lessened. As a result, an effect such that the measurable range of the quantity of flow is enlarged is produced.

According to the invention, since the first or second flow velocity sensor is attachable to and detachable from the wall face of the pipe, the attaching operation and dealing at the time of trouble of the flow velocity sensor are easy and an effect of good maintenanceability is produced.

According to the invention, since the second flow velocity sensor is disposed in the narrower flow path which is the closest to the wall face of the pipe among the plurality of narrower flow paths, the attaching and detaching operations are further facilitated and an effect such that the maintenanceability is further improved is produced.

According to the invention, the plurality of first flow velocity sensors are provided and the quantity of flow is obtained on the basis of a mean value of outputs of the flow velocity sensors, so that the measurement accuracy especially in the range of the larger quantity of flow is improved. For example, when an abnormality occurs in a part of the plurality of first flow velocity sensors, the flow quantity measurement can be continued by the other first flow velocity sensor having no abnormality. Consequently, an effect such that the reliability especially in the range of the larger quantity of flow is improved is produced.

According to the invention, since the plurality of second flow velocity sensors are provided and the quantity of flow is obtained on the basis of a mean value of outputs of the plurality of second flow velocity sensors, the measurement accuracy especially in the range of the smaller quantity of flow is improved. For example, when an abnormality occurs in a part of the plurality of second flow velocity sensors, the flow quantity measurement can be continued by the other second flow velocity sensor having no abnormality. Consequently, an effect such that the reliability especially in the range of the smaller quantity of flow is improved is produced.

According to another flowmeter of the invention, the flow velocity increasing means for increasing the flow velocity of the fluid passing through the narrower flow path in which the second flow velocity sensor is provided is further provided. Consequently, effects such that the flow velocity measurement sensitivity is increased and the measurable range of the quantity of flow is further expanded are produced.

According to the invention, the pair of column-shaped members constructing the flow velocity increasing means are provided upright on both sides of the second flow velocity sensor in such a manner that the interval between the pair of column-shaped members is widened toward the up stream of the flow path. Consequently, it makes the fluid easily pass between the pair of column-shaped members and an effect such that the flow velocity of the fluid can be easily increased is produced.

According to the invention, the second flow velocity sensor is integrated into a sensor unit with the pair of column-shaped members as the flow velocity increasing means and the sensor unit is constructed to be attachable to and detachable from the wall face of the pipe. Consequently, the work of attaching the pair of column-shaped members and the second flow velocity sensor to the pipe is facilitated and an effect of good maintenanceability is produced.

According to the invention, the flow velocity increasing means is constructed by the pair of column-shaped members which are provided upright on both sides of the second flow velocity sensor and at least a part of the pair of column-shaped members is formed in a streamline shape along the direction of the flow of the fluid. Thus, an effect such that the flow of the fluid passing through the part of the flow velocity increasing means can be made smooth is produced. To be specific, for example, when the front end part is streamlined, the fluid is easily led between the pair of column-shaped members and the flow velocity of the fluid can be easily increased. On the other hand, for example, when the rear end part is streamlined, the fluid led to between the pair of column-shaped embers can be easily exhausted from the rear end part and the fluid can be prevented from being stagnated in the rear end part.

According to further another flowmeter of the invention, since each of the plurality of flow velocity sensors is prevented from being influenced by the disturbed flow of the fluid caused by the existence of another flow velocity sensor, the output signal of the flow velocity sensor is made stable. An effect such that the stable flow quantity measurement can be realized is produced.

According to the invention, a plurality of flow velocity sensors are disposed out of on a straight line along the direction of the flow of the fluid. Consequently, the flow velocity sensor on the downstream side is not easily influenced by the disturbance in the flow caused by the existence of the flow velocity sensor on the upstream side, so that an effect such that the output signal from the flow velocity sensor on the downstream side is made stable is produced.

According to the invention, when a flow velocity distribution in a flow path cross section perpendicular to the direction of the flow of the fluid is nonuniform in the direction along the circumferential face of the flow path walls forming the flow path, one of the plurality of flow velocity sensors is disposed in the maximum flow velocity position in the flow velocity distribution in the direction along the circumferential face of the flow path wall. Consequently, the flow velocity sensor disposed in the maximum flow velocity position can detect the flow velocity with high sensitivity. When it is applied to, for example, the flow velocity sensor for measuring the quantity of flow in the range of the smaller quantity of flow, a very low quantity of flow can be measured with high sensitivity.

According to the invention, since the holding units each for holding each of the flow velocity sensors are smoothly embedded in the flow path walls without any gap and step, a disturbed flow does not easily occurs when a gas passes this place. Consequently, an effect such that the influence of the disturbed flow on the other flow velocity sensors can be reduced is produced.

According to the invention, when the positional relation among the plurality of flow velocity sensors is such that one of them is on the upstream side and the other is on the downstream side, by disposing the first mesh-like flow regulating member in the flow path between the flow velocity sensors, the influence of the disturbed flow in the fluid is eliminated. The flow of the fluid passed through the flow velocity sensor is therefore regulated by the action of the first mesh-like flow regulating member. Consequently, an effect such that the other fluid sensor is not easily influenced by the disturbed flow is produced.

According to the invention, while the quantity of flow in the range of the larger quantity of flow in which a large disturbed flow may occur is measured by using the upstream flow velocity sensor, the quantity of flow in the range of the smaller quantity of flow in which a large disturbed flow does not easily occur is measured by using the downstream flow velocity sensor. An effect such that the output signal of any flow velocity sensor is not easily influenced by the disturbed flow caused by the other flow velocity sensor is produced.

According to the invention, the flow path dividing member for dividing the flow path into a plurality of narrower flow paths is disposed. As compared with the case where the flow path dividing member is not provided, the flow velocity in the narrower flow path near the flow path wall can be increased. Further, an effect such that the sensitivity of the flow velocity measurement can be increased even when the flow velocity sensor is disposed near the flow path wall is therefore produced.

According to the invention, since the second mesh-like flow regulating member is disposed in the flow path on the upstream side of the plurality of flow velocity sensors, at least the flow of the fluid passing through the flow velocity sensor on the most upstream side is regulated by the action of the second mesh-like flow regulating member. Thus, an effect such that the output signal is made stable is produced.

Obviously many modifications and variations of the present invention are possible in the light of the above teachings. It is therefore to be understood that within the scope of the appended claims the invention may be practiced otherwise than as specifically described.

What is claimed is:

1. A flowmeter comprising:
   a pipe including a single flow path having a cross-sectional area which is almost uniform along a flow of a fluid, in which a measurement zone for smaller quantity of flow and a measurement zone for larger quantity of flow are provided along the longitudinal direction of the flow path;
   a flow path dividing member provided in the measurement zone for smaller quantity of flow in the flow path of the pipe to divide the flow path into a plurality of narrower flow paths each having a smaller cross-sectional area;
   a first flow velocity sensor provided in the measurement zone for larger quantity of flow in the flow path of the pipe, for outputting a signal according to a flow velocity of the fluid passing through the measurement zone for larger quantity of flow;
   a second flow velocity sensor that is disposed in one of the plurality of narrower flow paths formed by the flow path dividing member that is closest to a wall face of the pipe, for outputting a signal according to the flow velocity of the fluid passing through the narrower flow path that is closest to the wall face, the second flow velocity sensor being attached on the wall face of the pipe; and
   flow quantity calculating means for calculating a quantity of flow on the basis of at least one of the output signal of the first flow velocity sensor and the output signal of the second flow velocity sensor, in accordance with the quantity of flow.

2. The flowmeter according to claim 1, wherein the first flow velocity sensor is attachable to and detachable from the wall face of the pipe.

3. The flowmeter according to claim 1, wherein the second flow velocity sensor is attachable to and detachable from the wall face of the pipe.

4. The flowmeter according to claim 1, wherein the first flow velocity sensor is disposed near the wall face of the pipe.

5. The flowmeter according to claim 1, having a plurality of first flow velocity sensors, further comprising:
   mean flow velocity calculating means for the measurement zone for larger quantity of flow, which calculates a mean value of the flow velocities in the measurement zone for larger quantity of flow on the basis of the output signals of the plurality of first flow velocity sensors and outputs the mean value to the flow quantity calculating means.

6. The flowmeter according to claim 1, having a plurality of second flow velocity sensors, further comprising:
   mean flow velocity calculating means for the measurement zone for smaller quantity of flow, which calculates a mean value of the flow velocities in the measurement zone for smaller quantity of flow on the basis of the output signals of the plurality of second flow velocity sensors and outputs the mean value to the flow quantity calculating means.

7. The flowmeter according to claim 1, further comprising a mesh-like flow regulating member in the flow path.

8. The flowmeter according to claim 1, further comprising flow velocity increasing means for increasing the flow velocity of the fluid passing through the narrower flow path in which the second flow velocity sensor is provided.

9. The flowmeter according to claim 8, wherein the flow velocity increasing means increases the flow velocity of the fluid passing through the narrower flow path by decreasing a space capacity around the second flow velocity sensor in the narrower flow path.

10. The flowmeter according to claim 8, wherein the flow velocity increasing means is constructed by a pair of column-shaped members which are provided upright on both sides of the second flow velocity sensor.

11. The flowmeter according to claim 10, wherein the pair of column-shaped members of the flow velocity increasing means are provided upright on both sides of the second flow velocity sensor in such a manner that the interval between the pair of column-shaped members is widened toward the upstream of the flow path.

12. The flowmeter according to claim 10, wherein the second flow velocity sensor is integrated into a sensor unit with the pair of column-shaped members as the flow velocity increasing means, and the sensor unit is attachable to and detachable from the wall face of the pipe.

13. The flowmeter according to claim 10, wherein at least a part of the pair of column-shaped members as the flow velocity increasing means has a streamline shape along a direction of the flow of the fluid.

14. The flowmeter according to claim 10, wherein the pair of column-shaped members as the flow velocity increasing means are upright columns each having a cross section of a wing shape.

15. The flowmeter according to claim 8, having the plurality of first flow velocity sensors, further comprising:
   mean flow velocity calculating means for the measurement zone for larger quantity of flow, which calculates a mean value of the flow velocities in the measurement zone for larger quantity of flow on the basis of the output signals of the plurality of first flow velocity sensors and outputs the mean value to the flow quantity calculating means.

16. The flowmeter according to claim 8, having the plurality of second flow velocity sensors, further comprising:
   mean flow velocity calculating means for the measurement zone for smaller quantity of flow, which calculates a mean value of the flow velocities in the measurement zone for smaller quantity of flow on the basis of the output signals of the plurality of second flow velocity sensors and outputs the mean value to the flow quantity calculating means.

17. The flowmeter according to claim 8, wherein the second flow velocity sensor is disposed in the narrower flow path which is the closest to the wall face of the pipe among the plurality of narrower flow paths.

18. The flowmeter according to claim 8, wherein the first flow velocity sensor is disposed near the wall face of the pipe.

19. The flowmeter according to claim 8, further comprising a mesh-like flow regulating member in the flow path.

20. The flowmeter according to claim 8, wherein the first flow velocity sensor has a sensitivity adapted to measure the flow velocity in the range of the larger quantity of flow, the second flow velocity sensor has a sensitivity adapted to measure the flow velocity in the range of the smaller quantity of flow, and
   the flow quantity calculating means calculates the quantity of flow in the range of the larger quantity of flow on the basis of the output signal of the first flow velocity sensor and calculates the quantity of flow in the range of the smaller quantity of flow on the basis of the output signal of the second flow velocity sensor.

21. The flowmeter according to claim 8, wherein the flow path in the pipe extends linearly.

22. The flowmeter according to claim 8, wherein the pipe has a straight pipe shape.

23. The flowmeter according to claim 8, wherein each of the first and second flow velocity sensors is a thermal flow velocity sensor.

24. The flowmeter according to claim 8, wherein the measurement zone for smaller quantity of flow and the measurement zone for larger quantity of flow are spatially different from each other.

25. The flowmeter according to claim 8, wherein the flow velocity increasing means is integrated with the flow path dividing member and disposed in the narrower flow path.

26. The flowmeter according to claim 8, wherein the flow velocity increasing means is disposed in the narrower flow path which is the closest to the wall face of the pipe among the plurality of narrower paths formed by the flow path dividing member.

27. The flowmeter according to claim 1, wherein the first flow velocity sensor has a sensitivity adapted to measure the flow velocity in the range of the larger quantity of flow, the second flow velocity sensor has a sensitivity adapted to measure the flow velocity in the range of the smaller quantity of flow, and
   The flow quantity calculating means calculates the quantity of flow in the range of the larger quantity of flow on the basis of an output signal of the first flow velocity sensor and calculates the quantity of fin the range of the smaller quantity of flow on the basis of an output signal of the second flow velocity sensor.

28. The flowmeter according to claim 1 wherein the flow path in the pipe extends linearly.

29. The flowmeter according to claim 1, wherein the pipe has a straight pipe shape.

30. The flowmeter according to claim 1, wherein each of the first and second flow velocity sensors is a thermal flow velocity sensor.

31. The flowmeter according to claim 1, wherein the measurement zone for smaller quantity of flow and the measurement zone for larger quantity of flow are spatially different from each other.

32. The flowmeter according to claim 1, wherein the measurement zone for smaller quantity of flow and the measurement zone for larger quantity of flow are provided in series in the single flow path of the pipe.

33. The flowmeter according to claim 32, wherein the measurement zone for smaller quantity of flow is provided on the upstream side and the measurement zone for larger quantity of flow is provided on the downstream side.

34. A flowmeter, comprising:
a plurality of flow velocity sensors provided in a single flow path having a cross-sectional area which is almost uniform along a flow of a fluid, for outputting signals according to a flow velocity of the fluid; and
flow quantity calculating means for calculating the quantity of flow on the basis of at least one of the output signals of the plurality of flow velocity sensors in accordance with the quantity of flow,
wherein each of the plurality of flow velocity sensors is prevented from being influenced by the disturbed flow of the fluid, caused by the existence of another flow velocity sensor,
further wherein, a flow velocity distribution in a flow path cross section perpendicular to a direction of the flow of the fluid is nonuniform in the direction along a circumferential face of a flow path wall forming the flow path; and
one of the plurality of flow velocity sensors is disposed in a maximum flow velocity position in the flow velocity distribution in the direction along the circumferential face of the flow path wall.

35. The flowmeter according to claim 34, wherein the plurality of flow velocity sensors are disposed out of on a straight line along a direction of the flow of the fluid, thereby eliminating the influence of the disturbed flow of the fluid.

36. The flowmeter according to claim 35, wherein a part of the plurality of flow velocity sensors is disposed on the upstream side in the flow path, the other flow velocity sensors are disposed on the downstream side in the flow path, and
the flow quantity calculating means calculates the quantity of flow in the range of the larger quantity of flow on the basis of output signals of the part of the flow velocity sensors and calculates the quantity of flow in the range of the smaller quantity of flow in the basis of output signals of the other flow velocity sensors, thereby eliminating the influence of the disturbed flow of the fluid.

37. The flowmeter according to claim 34, wherein holding units each for holding each of the flow velocity sensors are smoothly embedded in flow path walls that define the flow path, the holding units being embedded without any gap and step, thereby suppressing a disturbance of the flow of the fluid.

38. The flowmeter according to claim 34, wherein a positional relation among the plurality of flow velocity sensors is such that one of the flow velocity sensors is on the upstream side and the other is on the downstream side,
further comprising a first mesh-like flow regulating member disposed in the flow path between the flow velocity sensors, thereby eliminating the influence of the disturbed flow of the fluid.

39. The flowmeter according to claim 34, wherein a part of the plurality of flow velocity sensors is disposed on the upstream side in the flow path, the other flow velocity sensors are disposed on the downstream side in the flow path, and
the flow quantity calculating means calculates the quantity of flow in a range of the larger quantity of flow on the basis of output signals of the part of the flow velocity sensors and calculates the quantity of flow in the range of the smaller quantity of flow on the basis of output signals of the other flow velocity sensors, thereby eliminating the influence of the disturbed flow of the fluid.

40. The flowmeter according to claim 34, further comprising a flow path dividing member disposed in the flow path for dividing the flow path into a plurality of narrower flow paths each having a smaller cross-sectional area.

41. The flowmeter according to claim 34, further comprising a mesh-like flow regulating member disposed in the flow path on the upstream side of the plurality of flow velocity sensors.

42. The flowmeter according to claim 34, wherein at least a part of the plurality of flow velocity sensors is disposed near the wall face of the flow path.

43. The flowmeter according to claim 21, wherein the flow path in the pipe extends linearly.

44. The flowmeter according to claim 34, wherein the pipe has a straight pipe shape.

45. The flowmeter according to claim 34, wherein each of the first and second flow velocity sensors is a thermal flow velocity sensor.

46. The flowmeter according to claim 34, wherein at least two flow velocity sensors among the plurality of flow velocity sensors are disposed in the cross section perpendicular to the direction of the flow of the fluid in the flow path.

47. The flowmeter according to claim 46, wherein at least two flow velocity sensors include a flow velocity sensor having a sensitivity adapted to measure the flow velocity in the range of the larger quantity of flow and a flow velocity sensor having a sensitivity adapted to measure the quantity of flow in the range of the smaller quantity of flow.

48. A flowmeter for measuring the quantity of flow of a fluid passing through a single flow path formed in a pipe extending in a straight pipe shape, comprising:
a flow path dividing member disposed in the single flow path to form a plurality of narrower flow paths each having a smaller cross-sectional area;
a first flow velocity sensor for measuring larger quantity of flow disposed on the downstream or upstream side of the flow path dividing member along the flow of the fluid in the single flow path;
a second flow velocity sensor for measuring smaller quantity of flow disposed in one of the plurality of narrower flow paths formed by the flow path dividing member that is closest to a wall face of the pipe, for outputting a signal according to the flow velocity of the fluid passing through the narrower flow path that is closest to the wall face, the second flow velocity sensor being attached on the wall face of the pipe; and
flow quantity calculating means for calculating the quantity of flow on the basis of at least one of a signal outputted from the first flow velocity sensor responsive to the flow velocity of the fluid and a signal outputted from the second flow velocity sensor responsive to the flow velocity of the fluid, in accordance with the quantity of flow.

49. A flowmeter for measuring the quantity of flow of a fluid passing through a single flow path formed in a pipe extending in a straight pipe shape, comprising;

a plurality of flow velocity sensors provided on flow path walls forming the single flow path, for outputting signals responsive to a flow velocity of the fluid; and flow quantity calculating means for calculating the quantity of flow on the basis of at least one of the output signals of the plurality of flow velocity sensors, in accordance with the quantity of flow, wherein each of the plurality of flow velocity sensors is prevented from being influenced by a disturbed flow of a fluid caused by the existence of another flow velocity sensor, further wherein, a flow velocity distribution in a flow path cross section perpendicular to a direction of the flow of the fluid is nonuniform in the direction along a circumferential face of the flow path wall of the pipe, and one of the plurality of flow velocity sensors is disposed in a maximum flow velocity position in the flow velocity distribution in the direction along the circumferential face of the flow path wall.

50. The flowmeter according to claim 49, wherein any two of the plurality of flow velocity sensors are disposed out of on a straight line along the direction of the flow of the fluid, thereby eliminating the influence of the disturbed flow of the fluid.

* * * * *